United States Patent
Sedky et al.

(10) Patent No.: US 8,243,317 B2
(45) Date of Patent: Aug. 14, 2012

(54) HIERARCHICAL ARRANGEMENT FOR SPOOLING JOB DATA

(75) Inventors: Khaled S. Sedky, Sammamish, WA (US); Daniel F. Emerson, Redmond, WA (US); Feng Yue, Sammamish, WA (US); Harvinder Pal Singh, Redmond, WA (US); Oliver H. Foehr, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1765 days.

(21) Appl. No.: 11/088,491

(22) Filed: Mar. 24, 2005

(65) Prior Publication Data

US 2005/0243368 A1     Nov. 3, 2005

Related U.S. Application Data

(63) Continuation-in-part of application No. 10/938,476, filed on Sep. 10, 2004.

(60) Provisional application No. 60/567,890, filed on May 3, 2004, provisional application No. 60/567,920, filed on May 3, 2004.

(51) Int. Cl.
*G06K 15/00* (2006.01)
*G06F 3/12* (2006.01)
*G06F 17/00* (2006.01)

(52) U.S. Cl. ............... 358/1.16; 358/1.13; 358/1.15; 358/1.18; 715/255

(58) Field of Classification Search ................ None
See application file for complete search history.

(56) References Cited

U.S. PATENT DOCUMENTS

| | | |
|---|---|---|
| 4,410,286 A | 10/1983 | Ko et al. |
| 4,556,959 A | 12/1985 | Allen et al. |
| 4,594,674 A | 6/1986 | Boulia et al. |
| 4,649,513 A | 3/1987 | Martin et al. |
| 4,870,611 A | 9/1989 | Martin et al. |
| 5,179,702 A | 1/1993 | Spix et al. |
| 5,222,205 A | 6/1993 | Larson et al. |
| 5,469,532 A | 11/1995 | Gerlach et al. |
| 5,469,533 A | 11/1995 | Dennis |
| 5,487,138 A | 1/1996 | Rust et al. |
| 5,537,526 A | 7/1996 | Anderson et al. |
| 5,613,124 A | 3/1997 | Atkinson et al. |
| 5,699,493 A | 12/1997 | Davidson, Jr. et al. |
| 5,727,220 A | 3/1998 | Hohensee et al. |
| 5,745,121 A | 4/1998 | Politis |
| 5,745,122 A | 4/1998 | Gay et al. |
| 5,745,910 A | 4/1998 | Piersol et al. |

(Continued)

OTHER PUBLICATIONS

"Apache Server Frequently Asked Questions"; Apache HTTP Server Version 1.3; retrieved Apr. 19, 2004 at http://httpd.apache.org/docs/misc/FAQ.html.; 35 pages.

(Continued)

*Primary Examiner* — Vincent Rudolph
(74) *Attorney, Agent, or Firm* — Lee & Hayes, PLLC

(57) ABSTRACT

A hierarchical spooling data structure includes a plurality of nodes. In accordance with certain aspects, the plurality of nodes include at least four nodes: a first node representing a fixed page of the job; a second node representing a fixed document of the job, the second node including a reference to the first node; a third node containing data representing a fixed sequence of documents of the job, the third node including a reference to the second node; and a fourth node containing data representing a root of the job, the fourth node including a reference to the third node.

19 Claims, 6 Drawing Sheets

U.S. PATENT DOCUMENTS

| | | |
|---|---|---|
| 5,752,055 A | 5/1998 | Redpath et al. |
| 5,752,056 A | 5/1998 | Celik |
| 5,806,078 A | 9/1998 | Hug et al. |
| 5,819,295 A | 10/1998 | Nakagawa et al. |
| 5,845,058 A | 12/1998 | Shaw et al. |
| 5,869,824 A | 2/1999 | Okada et al. |
| 5,903,903 A | 5/1999 | Kennedy |
| 5,905,504 A | 5/1999 | Barkans et al. |
| 5,911,138 A | 6/1999 | Li et al. |
| 5,920,684 A | 7/1999 | Hastings et al. |
| 5,940,581 A | 8/1999 | Lipton |
| 5,950,215 A | 9/1999 | Tabuchi |
| 5,960,168 A | 9/1999 | Shaw et al. |
| 5,993,088 A | 11/1999 | Nogay et al. |
| 6,002,814 A | 12/1999 | Chadez |
| 6,005,574 A | 12/1999 | Herrod |
| 6,026,416 A | 2/2000 | Kanerva et al. |
| 6,070,175 A | 5/2000 | Mezei |
| 6,094,665 A | 7/2000 | Lyons et al. |
| 6,115,044 A | 9/2000 | Alimpich et al. |
| 6,134,552 A | 10/2000 | Fritz et al. |
| 6,138,162 A | 10/2000 | Pistriotto et al. |
| 6,144,974 A | 11/2000 | Gartland |
| 6,173,295 B1 | 1/2001 | Goertz et al. |
| 6,182,080 B1 | 1/2001 | Clements |
| 6,182,096 B1 | 1/2001 | Mastie et al. |
| 6,195,676 B1 | 2/2001 | Spix et al. |
| 6,199,082 B1 | 3/2001 | Ferrel et al. |
| 6,212,530 B1 | 4/2001 | Kadlec |
| 6,247,018 B1 | 6/2001 | Rheaume |
| 6,247,066 B1 | 6/2001 | Tanaka |
| 6,269,403 B1 | 7/2001 | Anders |
| 6,344,855 B1 | 2/2002 | Fisher et al. |
| 6,362,870 B2 | 3/2002 | Mui et al. |
| 6,385,727 B1 | 5/2002 | Cassagnol et al. |
| 6,393,442 B1 | 5/2002 | Cromarty et al. |
| 6,407,821 B1 | 6/2002 | Hohensee et al. |
| 6,418,448 B1 | 7/2002 | Sarkar |
| 6,427,230 B1 | 7/2002 | Goiffon et al. |
| 6,447,184 B2 | 9/2002 | Kimura et al. |
| 6,449,653 B2 | 9/2002 | Klemets et al. |
| 6,457,017 B2 | 9/2002 | Watkins et al. |
| 6,466,935 B1 | 10/2002 | Stuart |
| 6,480,206 B2 | 11/2002 | Prinzing |
| 6,498,657 B1 | 12/2002 | Kuntz et al. |
| 6,505,219 B1 | 1/2003 | MacLean et al. |
| 6,507,858 B1 | 1/2003 | Kanerva et al. |
| 6,509,974 B1 | 1/2003 | Hansen |
| 6,519,557 B1 | 2/2003 | Emens et al. |
| 6,538,760 B1 | 3/2003 | deBry et al. |
| 6,549,918 B1 | 4/2003 | Probert, Jr. et al. |
| 6,559,966 B1 | 5/2003 | Laverty et al. |
| 6,571,279 B1 | 5/2003 | Herz et al. |
| 6,583,789 B1 | 6/2003 | Carlson et al. |
| 6,587,128 B2 | 7/2003 | Kanevsky et al. |
| 6,591,278 B1 | 7/2003 | Ernst |
| 6,604,144 B1 | 8/2003 | Anders |
| 6,608,693 B1 | 8/2003 | Loyd et al. |
| 6,609,200 B2 | 8/2003 | Anderson et al. |
| 6,615,281 B1 | 9/2003 | Temple, III |
| 6,654,147 B1 | 11/2003 | Ramot |
| 6,657,647 B1 | 12/2003 | Bright |
| 6,658,477 B1 | 12/2003 | Lisitsa et al. |
| 6,674,540 B1 | 1/2004 | Wiechers et al. |
| 6,675,353 B1 | 1/2004 | Friedman |
| 6,675,356 B1 | 1/2004 | Adler et al. |
| 6,681,223 B1 | 1/2004 | Sundaresan |
| 6,715,126 B1 | 3/2004 | Chang et al. |
| 6,763,343 B1 | 7/2004 | Brooke et al. |
| 6,765,584 B1 | 7/2004 | Wloka et al. |
| 6,771,291 B1 | 8/2004 | DiStefano, III |
| 6,781,609 B1 | 8/2004 | Barker et al. |
| 6,785,654 B2 | 8/2004 | Cyr et al. |
| 6,789,229 B1 | 9/2004 | Dunietz |
| 6,812,941 B1 | 11/2004 | Brown et al. |
| 6,826,626 B1 | 11/2004 | McManus |
| 6,833,925 B1 | 12/2004 | Igoe et al. |
| 6,867,874 B1 | 3/2005 | Shima |
| 6,883,981 B2 | 4/2005 | Kizaki et al. |
| 6,891,632 B2 | 5/2005 | Schwartz |
| 6,910,843 B2 | 6/2005 | Saw et al. |
| 6,917,976 B1 | 7/2005 | Slaughter et al. |
| 6,925,597 B2 | 8/2005 | Anwar |
| 6,925,631 B2 | 8/2005 | Golden |
| 6,941,511 B1 | 9/2005 | Hind et al. |
| 6,944,515 B2 | 9/2005 | Nakajima et al. |
| 6,952,801 B2 | 10/2005 | Warmus et al. |
| 6,968,557 B1 | 11/2005 | Zhang et al. |
| 6,976,257 B2 | 12/2005 | Leymann et al. |
| 6,992,785 B1 | 1/2006 | Chatcavage et al. |
| 7,017,162 B2 | 3/2006 | Smith et al. |
| 7,027,660 B2 | 4/2006 | Hersch et al. |
| 7,043,688 B1 * | 5/2006 | Tsutsumi et al. .............. 715/255 |
| 7,047,237 B2 | 5/2006 | Suzuki et al. |
| 7,051,276 B1 | 5/2006 | Mogilevsky et al. |
| 7,051,330 B1 | 5/2006 | Kaler et al. |
| 7,092,963 B2 | 8/2006 | Ryan et al. |
| 7,103,625 B1 | 9/2006 | Hipp et al. |
| 7,106,275 B2 | 9/2006 | Brunner et al. |
| 7,131,060 B1 | 10/2006 | Azuma |
| 7,134,071 B2 | 11/2006 | Ohwada et al. |
| 7,136,941 B2 | 11/2006 | Nguyen et al. |
| 7,162,538 B1 | 1/2007 | Cordova |
| 7,171,471 B1 | 1/2007 | Nair |
| 7,181,731 B2 | 2/2007 | Pace et al. |
| 7,209,921 B2 | 4/2007 | Pace et al. |
| 7,271,935 B2 | 9/2007 | Coons et al. |
| 7,274,483 B2 | 9/2007 | Aiyama et al. |
| 7,295,336 B2 | 11/2007 | Yoshida et al. |
| 7,302,634 B2 | 11/2007 | Lucovsky et al. |
| 7,359,902 B2 | 4/2008 | Ornstein et al. |
| 7,426,525 B2 | 9/2008 | Sayers et al. |
| 7,487,464 B2 | 2/2009 | Grotjohn et al. |
| 7,512,265 B1 | 3/2009 | Skirko |
| 7,549,118 B2 | 6/2009 | Shur et al. |
| 7,636,792 B1 | 12/2009 | Ho |
| 7,719,546 B1 | 5/2010 | Yhann et al. |
| 7,755,786 B2 | 7/2010 | Foehr et al. |
| 2001/0003828 A1 | 6/2001 | Peterson et al. |
| 2001/0013043 A1 | 8/2001 | Wagner |
| 2001/0013947 A1 | 8/2001 | Van Der Linden et al. |
| 2001/0018697 A1 | 8/2001 | Kunitake et al. |
| 2001/0022592 A1 | 9/2001 | Alimpich et al. |
| 2001/0043358 A1 | 11/2001 | Schwartz |
| 2001/0044809 A1 | 11/2001 | Parasnis et al. |
| 2002/0002667 A1 | 1/2002 | Kelsey et al. |
| 2002/0049790 A1 | 4/2002 | Ricker et al. |
| 2002/0065848 A1 | 5/2002 | Walker et al. |
| 2002/0073236 A1 | 6/2002 | Helgeson et al. |
| 2002/0085020 A1 | 7/2002 | Carroll, Jr. |
| 2002/0087602 A1 | 7/2002 | Masuda et al. |
| 2002/0089691 A1 | 7/2002 | Fertlitsch et al. |
| 2002/0099797 A1 | 7/2002 | Merrell et al. |
| 2002/0107886 A1 | 8/2002 | Gentner et al. |
| 2002/0111133 A1 | 8/2002 | Wittkotter |
| 2002/0143523 A1 | 10/2002 | Balaji et al. |
| 2002/0159092 A1 * | 10/2002 | Christodoulou et al. .... 358/1.15 |
| 2002/0174145 A1 | 11/2002 | Duga et al. |
| 2002/0188638 A1 | 12/2002 | Hamscher |
| 2003/0009672 A1 | 1/2003 | Goodman |
| 2003/0018694 A1 | 1/2003 | Chen et al. |
| 2003/0028560 A1 | 2/2003 | Kudrolli et al. |
| 2003/0050932 A1 | 3/2003 | Pace et al. |
| 2003/0053118 A1 * | 3/2003 | Muramoto et al. .......... 358/1.15 |
| 2003/0078829 A1 | 4/2003 | Chen et al. |
| 2003/0079181 A1 | 4/2003 | Schumacher et al. |
| 2003/0093520 A1 | 5/2003 | Beesley |
| 2003/0103237 A1 * | 6/2003 | Han ............................ 358/1.18 |
| 2003/0126136 A1 | 7/2003 | Omoigui |
| 2003/0137539 A1 | 7/2003 | Dees |
| 2003/0142325 A1 | 7/2003 | Leslie |
| 2003/0149934 A1 | 8/2003 | Worden |
| 2003/0158851 A1 | 8/2003 | Britton et al. |
| 2003/0163552 A1 | 8/2003 | Savitzky et al. |
| 2003/0163589 A1 | 8/2003 | Bunce et al. |
| 2003/0167356 A1 | 9/2003 | Smith et al. |
| 2003/0172168 A1 | 9/2003 | Mak et al. |

| | | |
|---|---|---|
| 2003/0182152 A1 | 9/2003 | Nakajima et al. |
| 2003/0182311 A1 | 9/2003 | Nakajima et al. |
| 2003/0182450 A1 | 9/2003 | Ong et al. |
| 2003/0182656 A1 | 9/2003 | Leathers et al. |
| 2003/0187534 A1 | 10/2003 | Suzuki et al. |
| 2003/0187612 A1 | 10/2003 | Miyake |
| 2003/0187870 A1 | 10/2003 | Nakajima et al. |
| 2003/0195784 A1 | 10/2003 | Smith |
| 2003/0204495 A1 | 10/2003 | Lehnert |
| 2003/0229845 A1 | 12/2003 | Salesin et al. |
| 2003/0233420 A1 | 12/2003 | Stark et al. |
| 2004/0003388 A1 | 1/2004 | Jacquemot et al. |
| 2004/0021905 A1 | 2/2004 | Holmstead et al. |
| 2004/0032611 A1 | 2/2004 | Daly et al. |
| 2004/0034848 A1 | 2/2004 | Moore et al. |
| 2004/0047643 A1 | 3/2004 | Jackelen et al. |
| 2004/0049737 A1 | 3/2004 | Hunt et al. |
| 2004/0054669 A1 | 3/2004 | Seyrat et al. |
| 2004/0061729 A1 | 4/2004 | Green et al. |
| 2004/0066527 A1 | 4/2004 | Kloosterman et al. |
| 2004/0078755 A1 | 4/2004 | Shinjo et al. |
| 2004/0080764 A1 | 4/2004 | Sievert et al. |
| 2004/0083430 A1 | 4/2004 | Boonen |
| 2004/0103073 A1 | 5/2004 | Blake et al. |
| 2004/0111418 A1 | 6/2004 | Nguyen et al. |
| 2004/0117733 A1 | 6/2004 | Moreau et al. |
| 2004/0125389 A1* | 7/2004 | Tokura et al. ............ 358/1.9 |
| 2004/0130741 A1 | 7/2004 | Ferlitsch |
| 2004/0139049 A1 | 7/2004 | Hancock et al. |
| 2004/0153467 A1 | 8/2004 | Conover et al. |
| 2004/0160613 A1 | 8/2004 | Kurotsu et al. |
| 2004/0167941 A1 | 8/2004 | Prahlad et al. |
| 2004/0183837 A1 | 9/2004 | Watanabe et al. |
| 2004/0193465 A1 | 9/2004 | Sangroniz et al. |
| 2004/0193599 A1 | 9/2004 | Liu et al. |
| 2004/0194025 A1 | 9/2004 | Hubert et al. |
| 2004/0205622 A1 | 10/2004 | Jones et al. |
| 2004/0205623 A1 | 10/2004 | Weil et al. |
| 2004/0205653 A1 | 10/2004 | Hadfield et al. |
| 2004/0207869 A1 | 10/2004 | Endo |
| 2004/0216048 A1 | 10/2004 | Brown et al. |
| 2004/0225960 A1 | 11/2004 | Parikh et al. |
| 2004/0230608 A1 | 11/2004 | Ornstein et al. |
| 2004/0265026 A1 | 12/2004 | Lermant et al. |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0015767 A1 | 1/2005 | Nash et al. |
| 2005/0071385 A1 | 3/2005 | Rao |
| 2005/0086030 A1 | 4/2005 | Zeidman |
| 2005/0091343 A1 | 4/2005 | Murray, Jr. |
| 2005/0091574 A1 | 4/2005 | Maaniitty et al. |
| 2005/0097441 A1 | 5/2005 | Herbach et al. |
| 2005/0099398 A1 | 5/2005 | Garside et al. |
| 2005/0104894 A1 | 5/2005 | Sanborn et al. |
| 2005/0125720 A1 | 6/2005 | Little et al. |
| 2005/0132279 A1 | 6/2005 | Relyea et al. |
| 2005/0132304 A1 | 6/2005 | Guido et al. |
| 2005/0138540 A1 | 6/2005 | Baltus et al. |
| 2005/0144556 A1 | 6/2005 | Petersen et al. |
| 2005/0179921 A1 | 8/2005 | Brossman et al. |
| 2005/0187803 A1 | 8/2005 | Jain et al. |
| 2005/0190186 A1 | 9/2005 | Klassen |
| 2005/0198069 A1* | 9/2005 | Cherry et al. ............ 707/104.1 |
| 2005/0210026 A1 | 9/2005 | Wood |
| 2005/0210227 A1 | 9/2005 | Emerson et al. |
| 2005/0223312 A1 | 10/2005 | Erdtmann et al. |
| 2005/0251742 A1 | 11/2005 | Mogilevsky et al. |
| 2005/0278616 A1 | 12/2005 | Eller |
| 2005/0278626 A1 | 12/2005 | Malik |
| 2005/0286063 A1 | 12/2005 | Owen et al. |
| 2006/0031749 A1 | 2/2006 | Schramm et al. |
| 2006/0041838 A1 | 2/2006 | Khan |
| 2006/0047743 A1 | 3/2006 | Yuan et al. |
| 2006/0056334 A1 | 3/2006 | Yuan et al. |
| 2006/0080316 A1 | 4/2006 | Gilmore et al. |
| 2006/0117019 A1 | 6/2006 | Sylthe et al. |
| 2006/0117268 A1 | 6/2006 | Talley et al. |
| 2006/0136827 A1 | 6/2006 | Villaron et al. |
| 2006/0146353 A1 | 7/2006 | Yue et al. |
| 2006/0155529 A1 | 7/2006 | Ludviksson et al. |
| 2006/0206794 A1 | 9/2006 | Ornstein et al. |
| 2008/0021923 A1 | 1/2008 | Sedky et al. |
| 2008/0043286 A1 | 2/2008 | Yoshida et al. |

OTHER PUBLICATIONS

Ashcraft, et al., "SPOOLES: An Object-Oriented Sparse Matrix Library", retrieved on Jan. 21, 2009 at <<http://citeseerx.ist.psu.edu/viewdoc/summary?doi=10.1.1.44.5809>>, Proceedings of the 9th SIAM Conference on Parallel Processing for Scientific Computing, Mar. 1999, pp. 1-10.

Bluethman, et al., "Interleaved Graphics and Text", IBM Technical Bulletin, Apr. 1980, vol. 22, No. 4, Oct. 1986, pp. 4813-4815.

Chien, et al., "Efficient Schemes for Managing Multiversion XML Documents", University of California, California, Dec. 19, 2002, pp. 332-353.

Christodoulakis, et al., "Multimedia Document Presentation, Information Extraction, and Document Formation in MINOS: A Model and a System", ACM Transaction on Office Information Systems, vol. 4, No. 4, Oct. 1986, pp. 345-383.

"Controlling the Data Chaos by Adding Intelligence to Media", Adobe System 2004, available at http://www.adobe.com/products/xmp/pdfs/xmp_data_chaos.pdf., 4 pages.

Duce et al., "Web 2D Graphics File Formats", Google 2003, Computer Graphics Forum, vol. 21, No. 1, Mar. 2002, pp. 43-65.

Eisenberg, et al., "Consensus of Subjective Probabilities: The Pari-Mutuel Method", The Annals of Mathematical Statistics, vol. 30, No. 1, Mar. 1959, pp. 165-168.

El-Kwae, et al., "Document Image Representation Using XML Technologies", Proceedings of SPIE, vol. 4670, Dec. 2001, pp. 109-120.

Ellis, "Postscript, Bezier Curves and Chinese Character," 17th Conf on Annual Computer Science Conf, Feb 1989, pp. 162-165.

Supplementary European Search Report mailed Jul. 14, 2011 for European patent application No. 04779161.1, 4 pgs.

Office Action for U.S. Appl. No. 10/938,476, mailed on Jun. 20, 2011, Khaled S. Sedky, "Spooling Strategies Using Structured Job Information", 19 pgs.

Girardot, et al., "Efficient Representation and Streaming XML Content Over the Internet Medium", IEEE 2000 Conf on Multimedia and Exp, Jul. and Aug. 2000, pp. 67-70.

Han, et al., "WebSplitter:A Unified XML Framework for Multi-Device Collaborative Web Browsing" IBM Thomas J. Watson research Centre, Hawthorne, CSCW, Dec. 2-6, 2000, ACM 1-58113-222-0/00/0012, pp. 221-230.

Hardy, et al., "Mapping and Displaying Structural Transformations between XML and PDF", ACM Symposium on Document Engineering, Nov. 2002, pp. 95-102.

Holman, "What is XSL-FO", Google, Mar. 20, 2002, pp. 1-4.

Ide, et al., "Outline of the International Standard Linguistic Annotation Framework", Proceedings of the ACL 2003 worksho on Linguistic Annotation, Jul. 11, 2003, pp. 1-5, retrieved from the internet at http://porial.acm.org/citation.cfm?id=1119297 on Jun. 28, 2011.

Jacobs, et al., "Adaptive Grid-Based Document Layout", ACM SIGGRAPH 2003, Jul. 2003, vol. 22, Issue 3, pp. 7.

Kanzaki, "RSS—Summary and Release of Site Information," retrieved on Feb. 17, 2010 from <<http://web.archive.org/web/20040408231744/http://www.kanzaki.com/docs/sw/rss.html>>, Mar. 2, 2004.

Korean Office Action mailed Feb. 9, 2011 for Korean Patent Application No. 10-2005-7009156, a counterpart foreign application of US Patent No. 7,359,902, 6 pgs.

Levy, et al., "Non-Distorted Texture Mapping for Sheared Triangulated Meshes", The 25th Conference on Computer Graphics and Interactive Techniques, ACM, Jul. 1998, pp. 343-352.

Marco, et al., "A Framework for Designing and Implementing the Ada Standard Container Library", ACM SIGAda, Dec. 2003, pp. 49-61.

Mengel, "MATE Dialogue Annotation Guidelines", Conference, Jan. 2000, retrieved from the internet at http://www.ims.uni-stuttgart.de/projekte/mate/mdag, 58 pgs.

Miller, "An Introduction to the Resource Description Framework", D-Lib Magazine, available at <<http://www.dlib.org/dlib/may98/miller/05miller.html>>, May 1998, 10 pages.

Moschini, "@tryinCSS3 (was Useragent Rules in CSS)", available at <<http://lists.w3.org/Archives/Public/www-style/2004Mar/0333.html>>, Mar. 31, 2004, 2 pages.

"Networked File System", retrieived Apr. 19, 2004 at <<http://www.scit.wlv.ac.uk/~jphb/comms/nfs.html, 6 pages.

Office Action for U.S. Appl. No. 12/402,319, mailed on May 13, 2011, Khaled S. Sedky, "Spooling Strategies Using Structured Job Information", 7 pgs.

Office Action for U.S. Appl. No. 12/402,319, mailed on Feb. 16, 2012, Khaled S. Sedky, "Spooling Strategies Using Structured Job Information", 17 pgs.

Non-final Office Action for U.S. Appl. No. 12/402,316, mailed on Aug. 30, 2011, Khaled S. Sedky, "Spooling Strategies Using Structured Job Information", 18 pages.

Official Notice of Rejection for China Patent Application No. 200480001329.4, Dec. 18, 2007, pp. 1-16.

"Open eBook Publication Structure 1.2", Open eBook Forum, Aug. 2002, 98 pgs.

Orchard, et al., "Versioning XML Languages W3C Proposed TAG finding [Editorial Draft]", Nov. 16, 2003, pp. 1-23.

Orchard, David; "Versioning XML Vocabularies" published on XML.com Dec. 3, 2003, retrieved Apr. 26, 2006, pp. 1-10.

Pawson, "Printing from XML: An Introduction to XSL-FO", Google, Oct. 9, 2002, pp. 1-4.

Peters et al.,"CrystalWeb—A Distributed Authoring Environment for the World-Wide Web" Computer Networks and ISDN Systems, North Holland Publishing. Amsterdam, NL. vol. 27, No. 6, Apr. 1995, pp. 861-870.

Reguero, et al., "Large Scale Print Spool Service", retrieved on Jan. 21, 2009 at <<http://citeseerx.ist.psu.edu/viewdoc/summary?doi=10.1.1.107.7406>>, Proceedings of the Twelfth Systems Administration Conference (LISA 1998), Boston, Massachusetts, Dec. 6-100, 1998, pp. 1-15.

Shade, et al., "Layered Depth Images", The 25th Annual Conference on Computer Graphics and Interactive Techniques, ACM, Jul. 1998, pp. 231-242.

"SOAP Version 1.2 Part 1: Messaging Framework", W3C Proposed Recommendation, available at <<http://www.w3.org/TR/2003/PR-soap12-part1-20030507>>, May 7, 2003, 25 pages.

Sun Microsystems, "JAR File Specification", retrieved on Feb. 17, 2010 at <<http://java.sun.com/j2se/1.5.0/docs/guide/jar/jar.html>>, 2003, 13 pgs.

Adobe, "Supported File Formats Photoshop Elements 5.0", retrieved at <<http://www.adobe.com/cfusion/knowledgebase/index.cfm?id=330350>>, Sep. 5, 2007, pp. 1-6.

"SVG Print", W3C Working Draft, available at <<http://www.w3.org/TR/2003/WD-SVGPrint-20030715/>>, Jul. 15, 2003 pp. 1-14.

TEI Consortium, "TEI: P4 Guidelines (Cover Sheet)", Jun. 2002, retrieved from the internet at http://www.tei-c.org/Guidelines/P4/ on Jun. 24, 2011, 198 pgs.

TEI Consortium, "Text Encoding Initiative", Mar. 2002, retrieved from the internet at http://www.tei-c.org/Guidelines/P4/pdf on Jun. 21, 2011, 1 pg.

"URIQA! The URI Query Agent Model, A Semantic Web Enabler", URIQA: The Nokia Query Agent, retrieved Jan. 11, 2005 at <<http://sw.nokia.com/uriqa/URIQA.html>>, 2004, 12 pages.

Wikipedia, "Adobe Photoshop Release History", Wikipedia, dated Oct. 28, 2008, pp. 1-7.

Wikipedia, "Windows NT 4.0", Nov. 6, 2008, pp. 1-9.

"Windows NT Server Printing", retrieved on Nov. 17, 2008 at <<http://www.microsoft.com/resources/documentation/windowsnt/4/server/reskit/en-us/resg . . . >>, 2008, pp. 1-35.

Adobe, "XMP Adding Intelligence to Media", XMP Specification, Jan. 2004, 11 pages.

Translated copy of the Japanese Office Action mailed May 2, 2012 for Japanese patent application No. 2007-510688, a counterpart foreign application of US patent No. 7,359,902, 6 pages.

Non-Final Office Action for U.S. Appl. No. 10/938,476, mailed on Apr. 25, 2012, Khaled S. Sedky et al., "Spooling Strategies Using Structured Job Information", 22 pages.

* cited by examiner

Example of Structured Job Information

HIERARCHICAL ARRANGEMENT FOR SPOOLING JOB DATA

This application is a continuation-in-part of U.S. patent application Ser. No. 10/938,476, entitled "Spooling Strategies Using Structured Job Information," filed on Sep. 10, 2004, which is incorporated herein by reference in its entirety.

This application claims the benefit of the following U.S. Provisional Applications, all filed on May 3, 2004, and each of which is incorporated by reference herein in its respective entirety: U.S. Provisional Application No. 60/567,890; and U.S. Provisional Application No. 60/567,920.

CROSS-REFERENCE TO RELATED APPLICATIONS

The present application is also related to co-pending and commonly assigned U.S. patent application Ser. No. 10/794,669, entitled "Multilevel Ticket-Based Job Management Architecture for Computing Devices," filed on Mar. 5, 2004, which is incorporated herein by reference in its entirety.

The present application is also related to co-pending and commonly assigned U.S. patent application Ser. No. 10/836,327, entitled "Document Mark Up Methods and Systems," filed on May 1, 2004, which is incorporated herein by reference in its entirety.

TECHNICAL FIELD

This subject matter relates to a format used for producing and consuming job information.

BACKGROUND

Computing devices commonly render documents using spooling techniques (where "spool" is an acronym for Simultaneous Peripheral Operations On-Line). In a typical spooling technique, an application on the computing device generates a document and a spooler on the computing device stores it in a spool storage. The spool storage can be implemented using memory (such as RAM memory), or, more commonly, using disk storage. When the device is ready to process the document, the device can then access the document from the spool storage and convert it to a format that is compatible with the format expectations of an output device (such as a format defined by the Page Description Language). The device can then forward the converted document to the output device, whereupon the output device prints the document, or performs some other processing with respect to the document. Storing a document in a spool storage (rather than directly outputting the document to the printer) is generally advantageous because it allows the application that generated the document, as well as the spooler, on the computing device to perform other tasks while the document is being processed for printing. Generally, a print job refers to the task of processing an identified document using a spooling strategy. The print job specifies job information to be processed by the spooling strategy.

Conventional strategies commonly generate and consume job information in a variety of proprietary and narrowly tailored formats. The lack of versatility, sophistication and uniformity in these formats can prevent the device from rendering job information in an efficient manner. Further, known conventional strategies do not provide versatile techniques for associating metadata with the job information. Known conventional strategies may suffer from yet additional unspecified deficiencies.

There is accordingly an exemplary need for more efficient strategies for using a spool storage.

SUMMARY

A hierarchical spooling data structure is described herein.

In accordance with certain aspects, job information stored in a spool storage has a plurality of nodes organized into a hierarchical arrangement representing the job information. The plurality of nodes include a first node representing a fixed page (a fixed layout, static content page) of the job, and a second node representing a fixed document (a fixed layout, static content document composed of fixed pages) of the job, the second node including a reference to the first node. The plurality of nodes further includes a third node containing data representing a fixed sequence of documents of the job (a fixed layout, static content sequence composed of fixed documents), the third node including a reference to the second node. The plurality of nodes may also include a fourth node containing data representing a root of the job, the fourth node including a reference to the third node.

DETAILED DESCRIPTION

Figure 1:
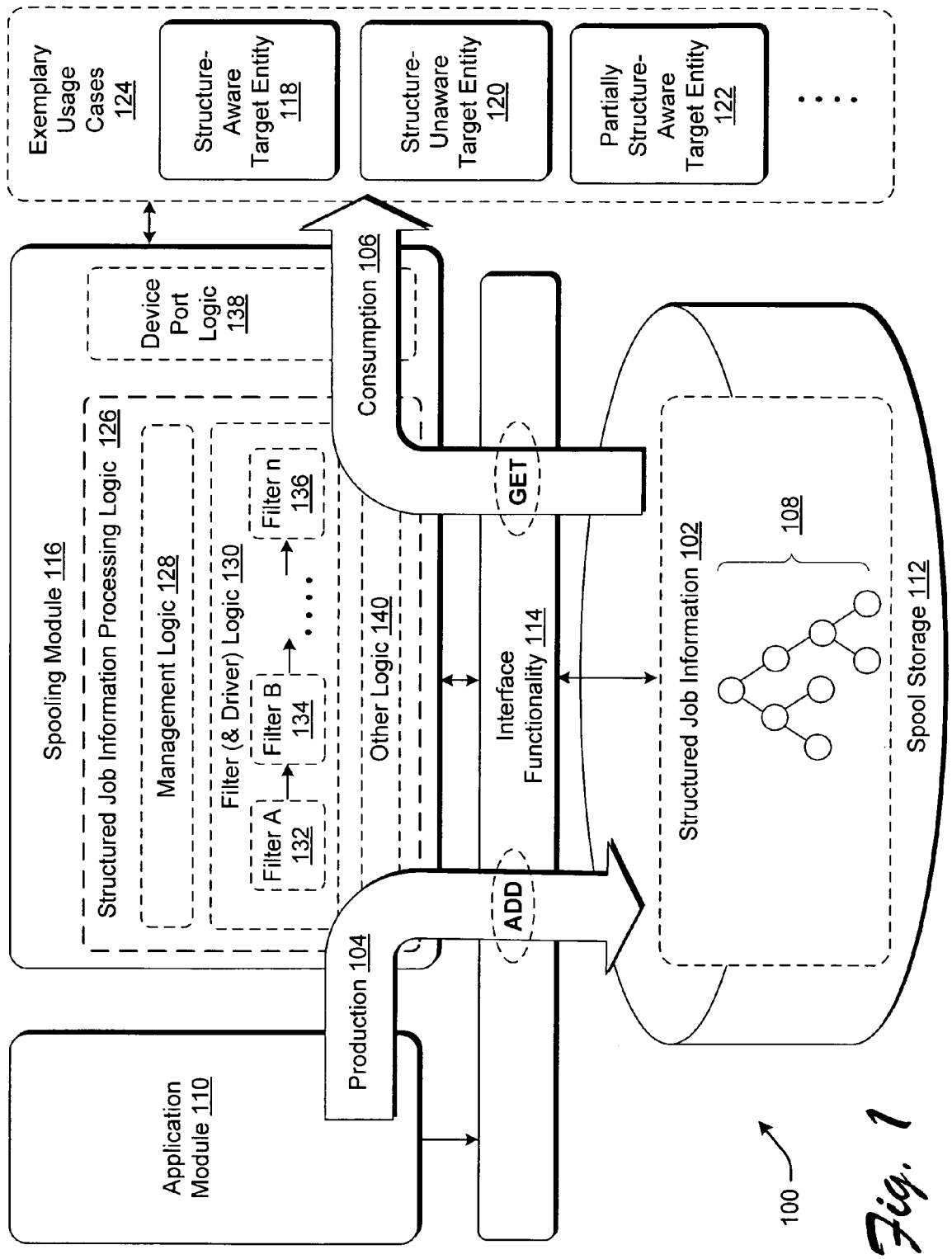
FIG. 1 shows an exemplary system for producing and consuming job information.

The following description sets forth an example hierarchical structure to be used in the generation and/or consumption of job information. In a production phase, the structured job information can be created and stored in a spool storage. In a consumption phase, the job information can then be retrieved from this storage for processing.

The term "job" used herein refers to a task in which one or more actions are performed to process a consolidated grouping information. For instance, a print job may entail printing job information that defines one or more documents. More generally, reference to "processing" job information can refer to any performing of operations using or based on such job information, such as any kind of rendering of the job information (e.g., printing or displaying the job information), distributing the job information to a target destination (with or without modifying it), archiving the job information, altering the job information based on metadata associated with the job information, making decisions regarding how to render or otherwise process the job information, or some other form of processing. The term "job information" refers to any kind of information used to specify the nature of the job, such as the actual information to be rendered, and/or information that defines how the job is to be rendered, and so on.

A "package" is a logical concept that refers to a collection of job information that comprehensively specifies an entire job. The package can contain multiple parts, also referred to as "elements" or "features" herein. In the case where the job information defines a hierarchical tree of nodes, such nodes may define respective elements in the package. Collections of elements can be treated as a single unit. For instance, a package may specify multiple documents, and each of these collections can contain multiple elements (e.g., image resources, font resources, etc.).

The term "document" as used herein refers to any unit of any kind of information. For example, a document may pertain to information created by a text editing application, a spreadsheet processing program, a drawing program, and so on. Each document can have multiple associated parts, each of which can itself be considered a component document in its own right. A job can specify documents that originate from multiple different sources.

The term "spool storage" represents storage for storing job information implemented using any physical storage medium. In one case, the spool storage may be implemented using RAM memory. In another case, the spool storage may be implemented using disk storage, solid state memory, or another type of physical storage medium. The spool storage can be fixed or removable. The spool storage may define a single file, a collection of associated files, or some other storage strategy. A unit of spool storage (such as a single file) that stores an entire package defining a job is also referred to as a "container."

More generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the terms "module," "functionality," or "logic" represent program code that performs specified tasks when executed on a processing device or devices (e.g., CPU or CPUs). The program code can be stored in one or more fixed and/or removable computer readable memory devices.

The above-mentioned processing device(s) can be implemented in different ways. For example, the processing device(s) can be implemented using semiconductor transistor-based computing mechanisms (e.g., by electronic integrated circuits (ICs) or fixed electronic logic circuitry). Alternatively, the processing device(s) can be implemented, in whole or in part, using quantum computing mechanisms, optical computing mechanisms, mechanical computing mechanisms, biological computing mechanisms, and so forth.

Certain discussions in this disclosure are framed in the exemplary context of an object-oriented programming paradigm. By way of background, in such an approach, an application implements program modules as respective objects. Objects can include properties which convey attributes of the objects (e.g., the characteristics or traits of the objects). Objects can include methods associated therewith that provide functions that can be performed by the objects. Objects interact by passing messages to each other. The object-oriented programming paradigm commonly organizes objects in parent-child hierarchies. A child inherits the properties of its parent. A class refers to a general "blueprint" which describes a collection of objects. However, the principles described herein are not to be construed as limited to an object-oriented programming paradigm.

This disclosure includes the following sections. Section A describes an exemplary system for producing and consuming structured job information. Section B describes an exemplary flowchart which explains the operation of the system of Section A. Section C describes an exemplary computer environment for implementing the system of Section A.

A. Exemplary System

A.1. Overview of System

FIG. 1 shows an exemplary system 100 for producing and consuming job information 102. The production of such job information 102 is generally represented by arrow 104, and the consumption of such job information 102 is generally represented by arrow 106. The job information 102 includes a defined hierarchical structure 108.

This Section (i.e., Section A.1) provides an overview of the system 100 used to produce and consume the structured job information 102. The next Section (i.e., Section A.2) delves into greater detail regarding the organization of the job information 102 itself.

By way of overview, the system 100 includes an application module 110 coupled to a spool storage 112 via interface functionality 114 (which can be implemented, in one example, as an application programming interface (API)). The spool storage 112 stores the job information 102. This chain of components implements the production aspects (104) of the processing of the job information 102. The system 100 also includes a spooling module 116 that is configured to retrieve the job information 102 from the spool storage 112 and then perform some kind of processing on it to provide an output result. This chain of components implements the consumption (106) aspects of the processing of the job information 102. As noted above, processing can refer to any kind of action performed on the job information 102, which may or may not modify the content of the job information 102. The processing may comprise printing the job information 102, displaying the job information 102, routing the job information 102 to a target location (with or without modifying it), archiving the job information 102, and so on. In any case, the recipient of the output result generated by the spooling module 116 can comprise one or more of the target entities (118, 120, 122, . . . ) associated with different usage cases 124. A variety of the usage cases 124 will be discussed below.

The modules, logic and storage units shown in the system 100 can be implemented by any variety and grouping of physical mechanisms and devices. In one exemplary case, a computing device (not shown) implements the application module 110, interface functionality 114, spool storage 112 and spooling module 116. More specifically, the various logic and modules (110, 112, 114, 116) can be implemented by machine readable code stored in the memory of the computing device and executed by the processing unit(s) of the computing device. The spool storage 112 can be implemented by a storage medium (e.g., a hard disk) provided by the computing device. The computing device can operate using any kind of platform (e.g., as defined by the operating system and/or other software configuration of the computing device). More specifically, in one implementation, the functionality and associated formats to be described below are specifically configured to operate using different computing platforms, thus defining a standard approach that has wide applicability to different technical environments and which thus serves to facilitate interaction among different technical environments and associated users.

In one case, the target entities (118, 120, 122, . . . ) can be implemented as devices that are separate from the computing device which implements the other components (110-116) of the system 100. The computing device can be communicatively coupled to the target entities (118, 120, 122, . . . ) via any kind of communication channel, such as is USB coupling, parallel coupling, network coupling of any kind, manual transport of removable media, and so forth. In a common case, for instance, one or more of the target entities (118, 120, 122, ...) can comprise printers for printing documents fed to them by the spooling module 116. The computing device can be communicatively coupled to the printer(s) via any kind of hardwired and/or wireless links using any kind of communication protocol. Or the spool storage 112 can be implemented as a removable media and transported to the printer. The target entities (118, 120, 122, ...) can alternatively represent display devices, storage devices, other computing devices, and so on.

The above allocation of system 100 functions to devices is only exemplary. In other implementations, different aspects of the system 100 can be implemented by separate computing devices. For instance, a first computing device can implement the application module 110 and a separate computing device can implement the spooling module 116. In other implementations, the spool storage 112 can also be implemented as a separate unit which couples to the computing device which implements the application module 110 and/or the spooling module 1116. In other implementations, the target entities (118, 120, 122, ...) can be integrated into the same computing device which implements the application module 110 and/or the spool module 116. Still other configurations are possible.

In any event, where one or more computing devices are used to perform aspects of the system 100, those computing devices can correspond to any type of computing devices, such as general purpose computing devices, application-specific computing devices (e.g., game consoles such as Xbox® video game systems produced by Microsoft Corporation of Redmond, Wash.), portable computing devices (such as a personal digital assistants, mobile phones, etc.), and so on. FIG. 10, to be discussed below in turn, shows one exemplary computer environment for implementing aspects of the system 100.

Further details regarding each of the above-identified components of the system 100 will follow. Beginning with the production aspect (104) of the system 100, the system 100 can use any kind of application module 110 to generate any kind of document. Common types of application modules 110 include text processing programs, spreadsheet processing programs, graphics processing programs, markup language processing programs, database search and retrieval programs, and so on. There is no constraint on the type of application program that can be used to supply job information 102 to be processed using the system 100. The application module 110 can represent a program implemented in any programming environment; for example, the application module 110 can be implemented as a managed program within the Microsoft Corporation's NET programming environment.

The interface functionality 114 formats the output of the application module 110 into the structure 108 of the job information 102. Generally, exemplary and non-limiting functions performed by the interface functionality 114 can include: (1) persisting the job information 102 in the spool storage 112 having the desired structure 108; (2) submitting job information 102 to the spooling module 116 for scheduling and printing; (3) monitoring different stages of the job production and hooking up to back end notifications to inform any interested listening entities; (4) monitoring different stages of the job consumption and hooking up to back end notifications to inform any interested listening entities; (5) enabling the spooling module 116 to send output data to the target entities (118, 120, 122, ...), and so on. The interface functionality 114 also provides functionality for retrieving information regarding the job information 102, and for enabling the generation of notifications for various events pertaining to the production and consumption of the job information 102.

In one implementation, interface functionality 114 produces the same uniform structure 108 regardless of the nature of the application module 110 which supplies the job data. For instance, the same interface functionality 114 can transform the output of a text editing application, spreadsheet application, graphics processing program, and so forth into the uniform structure 108. In another implementation, each application module 110 may include specifically tailored software to work in conjunction with the interface functionality 114 to provide the uniform structure 108. In such implementations, each application module 110 produces the uniform structure 108. Alternatively, or in addition, the spooling module 116 can play a role in the generation of the job information 102 having the uniform structure 108.

With respect to the consumption (106) aspect of the system 100, the system 100 retrieves the job information 102 from the spool storage 112 and supplies it to the spooling module 116 for processing. The spooling module 116 itself can represent a software program implemented by the same computing device that provides the application module 110. It includes processing logic 126 for processing the job information 102. The processing logic 126 can also be viewed as a printer driver. This processing logic 126, in turn, can include management logic 128 for governing various operations performed by the processing logic 126.

The processing logic 126 can include filter logic 130 for actually performing the required processing on the job information 102. As will be described in greater detail below, the filter logic 130 can include one or more filters (132, 134, ... 136) for performing different processing functions on the job information 102 to generate an output result or gather information regarding the job information or the target entities (118, 120, 122, ...). The spooling module 116 then feeds the final output result to one or more of the target entities (118, 120, 122, ...) via device port logic 138. In the common case of printing, one or more of the target entities (118, 120, 122, ...) can comprise a printer which receives the output result and prints the document(s) specified by the output result. Finally, the spooling module 116 can also include generically-labeled other logic 140 for performing other functions that are not pertinent to the focus of this disclosure and therefore will not be described further herein.

Further details regarding the filter logic 130 are provided as follows. In one implementation, the job information 102 that is processed by one or more of the filters (132, 134, ... 136) retains the same format structure 108 as the job information 102 stored in the spooler storage 112. Thus, in this exemplary implementation, the filter logic 130 does not require that the job information 102 be converted into an intermediary form in order to process it. This, in turn, enables the spooling module 116 to process job information 102 in an efficient manner. This also yields a uniform approach compared to other techniques which resort to a complicated assortment of disparate and ad hoc processing techniques to deal with different proprietary formats.

The functions performed by the individual filters (132, 134, ... 136) can be generalized in the following manner. A first class of filters accepts job information 102 which conforms to the structure 108, performs some kind of processing on this information 102 (which may or may not modify the information 102), and then generates an output result which also conforms to the structure 108. A second class of filters accepts job information 102 which conforms to the structure 108, performs some kind of processing on this information 102, and then generates an output result which does not conform to the structure 108 (or which only partially conforms to the structure 108). A third class of filters accepts job information 102 which has already been converted into a non-structured format, and provides yet further modification or processing of such non-structured information.

More specifically, for example, one or more initial filters of the first class can be set up to modify the job information 102 in various ways (such as by adding a watermark, etc.), but does not otherwise change its basic format structure 108. A terminal filter (or multiple terminal filters) of the second class can be set up to modify the job information 102 by changing its format, such as by either completely removing its format structure 108 or at least partially modifying its format structure 108. More specifically, the terminal filter n (e.g., filter n 136) (or plural terminal filters) can be used to convert job information 102 having the format structure 108 into a non-structured form that can be interpreted by an identified target entity (118, 120, 122, . . . ). In effect, the terminal filter n 136 (or filters) thus serves the role of a rendering module of a printer driver. For instance, filter n 136 may convert the job information 102 having the structure 108 into a page description language (PDL) format that can be fed to a printer which accepts such format. In another case, a filter n-1 can convert the job information 102 into a printer-interpretable format, and filter n 136 can perform post-processing on this format, such that the combination of filter n-1 and filter n can be considered as the printer driver.

Suppose, as explained above, that the terminal filter n 136 is a filter of the first class which generates an output result having job information 102 which still conforms to the structure 108. A target entity 118 represents an appropriate device to receive such an output result. This target entity 118 is referred to as "structure-aware" because it receives job information 102 conforming to the structure 108 and thus provides necessary processing functioning to recognize such information 102 and process it appropriately.

Suppose, alternatively, that the terminal filter n 136 is a filter of the second class or third class which generates job information which no longer conforms to the structure 108. A target entity 120 represents an appropriate entity to receive such an output result. This target entity 120 is referred to as "structure-unaware" because it receives job information 102 that no longer conforms to the structure 108, and thus the entity 120 does not need to devote any specialized functionality for processing information expressed in this structure 108; indeed, the target entity 120 need not, and generally will not, be aware that the job information 102 its receives (e.g., in an appropriate PDL format) was ever originally expressed using the structure 108.

There is a third case where the terminal filter n 136 generates an output result which modifies the structured format 108 to some extent, but still maintains some vestiges of the structure 108. Target entity 122 is an example of the kind of entity that can receive and process this output result. FIG. 1 identifies this kind of entity 122 as being "partially structure-aware" because it should include at least some processing functionality for interpreting whatever remnants of the structure 108 that still remain in the output result.

Some filters may not alter the job information, but rather gather information regarding the job information or the target entities (118, 120, 122, . . . ). Such filters may generate an output result of job information that is the same as the job information that is input to them, or alternatively may not output any job information. Rather than (or in addition to) outputting job information, such filters may output the information they have gathered. For example, a filter may be used to count the consumables the job uses and report to the usage back to an accounting application running on the same computing device as spooling module 116.

Different jobs may require that different filtering operations be performed on the associated job information 102. A filter configuration module (not shown) can be used to define what filters (132, 134, . . . 136) are to be invoked in processing a particular job, how the individuals filters (132, 134, . . . 136) are to be configured, and how the filters (132, 134, . . . 136) are to be chained together. In other words, the spooling module 116 can chain the filters (132, 134, . . . 136) together in different ways to produce different net effects. In a series configuration shown in FIG. 1, for example, filter A 132 feeds its output result into the input of filter B 134, and filter B 134 feed its output result into to the input of filter C (not shown), and so on.

More specifically, the type of processing that the filter logic 128 performs on the job information 102 can be controlled, in element, by one or more "print tickets" associated with the job information 102. The print tickets include attribute information that defines the operations that should be performed on the job information 102 as it passes through the filter logic 130. Different print tickets can be associated with different elements of the structure 108 of the job information 102, as will be described in the next subsection (A.2).

The system 100 can also function in a client-server mode of operation, where the spooling module 116 responds to requests from a client module (which may comprise one of the target entities). In a client-server implementation, a server-side application (not shown) creates document content "on-the-fly" in response to a client request. A server process generates parts of the job information 102, one at a time; while a separate process, at the same time, pulls parts from the job information 102, one at a time, to send "down" to the client module.

A.2. Overview of Structured Job Information Format

As shown in FIG. 1, the job information 102 generally includes a structure 108 defined by a plurality of nodes coupled together according to a set of established rules. The same general rules can apply to the construction and consumption of the structure 108 regardless of the application and application platform used to produce and consume the job information 102. The strategies described below therefore provide a standardized mechanism for sharing job information among participants within different programming environments.

The job information 102 uses a hierarchical scheme to connect its nodes together. A hierarchical scheme couples the nodes together using parent-child relationships. That is, a "top-most" node defines a so-called root node. The root node includes one or more child nodes, and the child nodes, in turn, can include one or more of their own respective child nodes, and so on. The child nodes can optionally inherit methods, properties, metadata, etc. associated with their respective parent/ancestor nodes.

Generally, the structure 108 is a logical concept that may or may not map to actual elements of a document to be rendered. That is, each node may be considered an object. Certain objects may represent actual elements of a document to be rendered (such as various image resources and font resources). Other objects may not have a one-to-one relationship with elements of the documents to be rendered. These latter types of nodes are therefore analogous to folders in a file hierarchy; that is, the folders may store individual files that contain content that maps to actual elements of the document, but the folders themselves may not have a one-to-one relationship with actual elements of the document.

Figure 2:
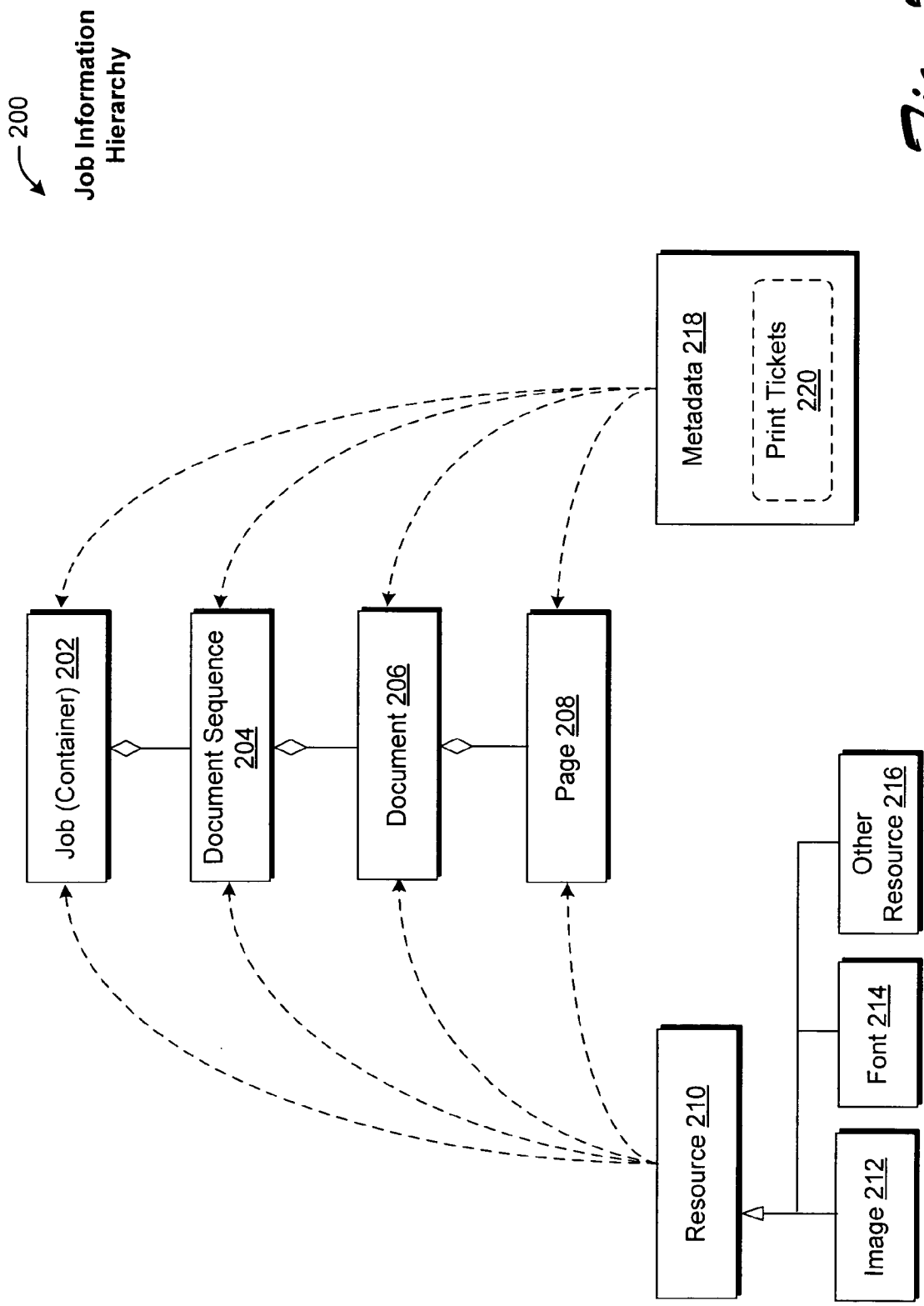
FIG. 2 shows one exemplary and non-limiting schema that can be used to form the job information having the structure shown in FIG. 1.

FIG. 2 shows one exemplary and non-limiting schema 200 that can be used to form the job information 102 having the structure 108 shown in FIG. 1. The schema 200 defines a way of arranging job information 102 originally provided by the application module 110 (e.g., in the form of documents generated by the application module 110) into the hierarchical structure 108. As mentioned above, the interface functionality 114 can perform this production task regardless of the nature of the application module 110. Or the spooling module 116 can also play a role in generating the required format structure 108.

The top level of the hierarchy specifies job-related information 202 that identifies the entire job itself. For instance, the job may pertain to the printing of multiple books, each book including multiple chapters, and each chapter, in turn, can include multiple pages, and each page, in turn, can include font resources and image resources. It should be noted that although resources are associated with job level 202, resources can be referenced or used by other levels in schema 200. In this example, the top level of the hierarchy identifies the logical package which encapsulates the entire job, that is, the entire book. The next level of the hierarchy specifies information 204 that identifies the document sequences associated with the job. In the example of the multiple books, the document sequence level might specify individual ones of the multiple books.

The next level of the hierarchy specifies information 206 that identifies the documents associated with the job. In the example of the multiple books, the document level might specify individual chapters in the books. Or this level of the hierarchy may specify different kinds of documents to be printed in a single print job, such as a first document created using a text editor, and a second document created using a spreadsheet program, and so on, where these two documents together comprise a report of some kind.

The next level of the hierarchy specifies information 208 that identifies different pages within the documents identified in the proceeding level.

Resources can be associated with the root level of the hierarchy defined by schema 200, which is job level 202. Although resources are associated with the root level of the hierarchy, other levels in the hierarchy can reference resources, as discussed in more detail below. This allows resources to be shared by the different levels of the hierarchy, even though they are associated with the root level of the hierarchy. Particular types of resources can include an image resource 212, a font resource 214, or some other resource 216.

Further, metadata 218 can be associated with any of the levels of the hierarchy of the schema 200. For instance, exemplary metadata 218 can be associated with the job level 202, the document sequence level 204, the document level 206, and/or the page level 208. Metadata 218 specifies any supplemental information pertaining to the job information 102, such as an author who created a document contained in the job, a time when the document was created, various keywords pertaining to the content, a summary of the content, and so on. There are no restrictions on the type of, and meaning assigned to, metadata that can be appended to different elements of the schema 200. A particular kind of metadata is a print ticket 220. The print ticket 220 can also be associated with any level of the hierarchy of the schema 200. For instance, exemplary metadata 220 can be associated with the job level 202, the document sequence level 204, the document level 206, and/or the page level 208. A print ticket defines the types of processing operations that should be performed on associated elements of the hierarchy of the job information 102. For instance, a print ticket associated with the job package level 202 will apply to the entirety of the package defined by the job information 102. A print ticket associated with an individual page 208 of the job information 102 will have a localized effect by only affecting that page 208. Further details regarding exemplary print tickets are provided in the above-captioned co-pending U.S. patent application Ser. No. 10/794,669.

Further, inheritance may optionally apply to the methods, properties, metadata, etc. in the job information 102. If inheritance is used, to determine what print instructions apply to any given node, the spooling module 116 can "walk" the tree from a child node to its root (or vice versa), aggregating any print instructions that may apply along the way. This aggregation allows general instructions to be uniformly inherited by all children. A print instruction of a child node may override the general instructions of a parent node.

In summary, the schema 200 shown in FIG. 2 provides a powerful, uniform and versatile mechanism for representing complex job information, particularly for those jobs that involve multiple document sequences and/or multiple documents. Traditional techniques provide no provisions for representing these kinds of complex scenarios in spool storage; therefore, these traditional techniques suffer from inefficiencies, which may be significant.

In one implementation, the hierarchy of the job information 102 is set to provide defined levels corresponding to jobs, document sequences, documents, and pages. In another implementation, the hierarchy can be varied in one or more respects.

Figure 3:
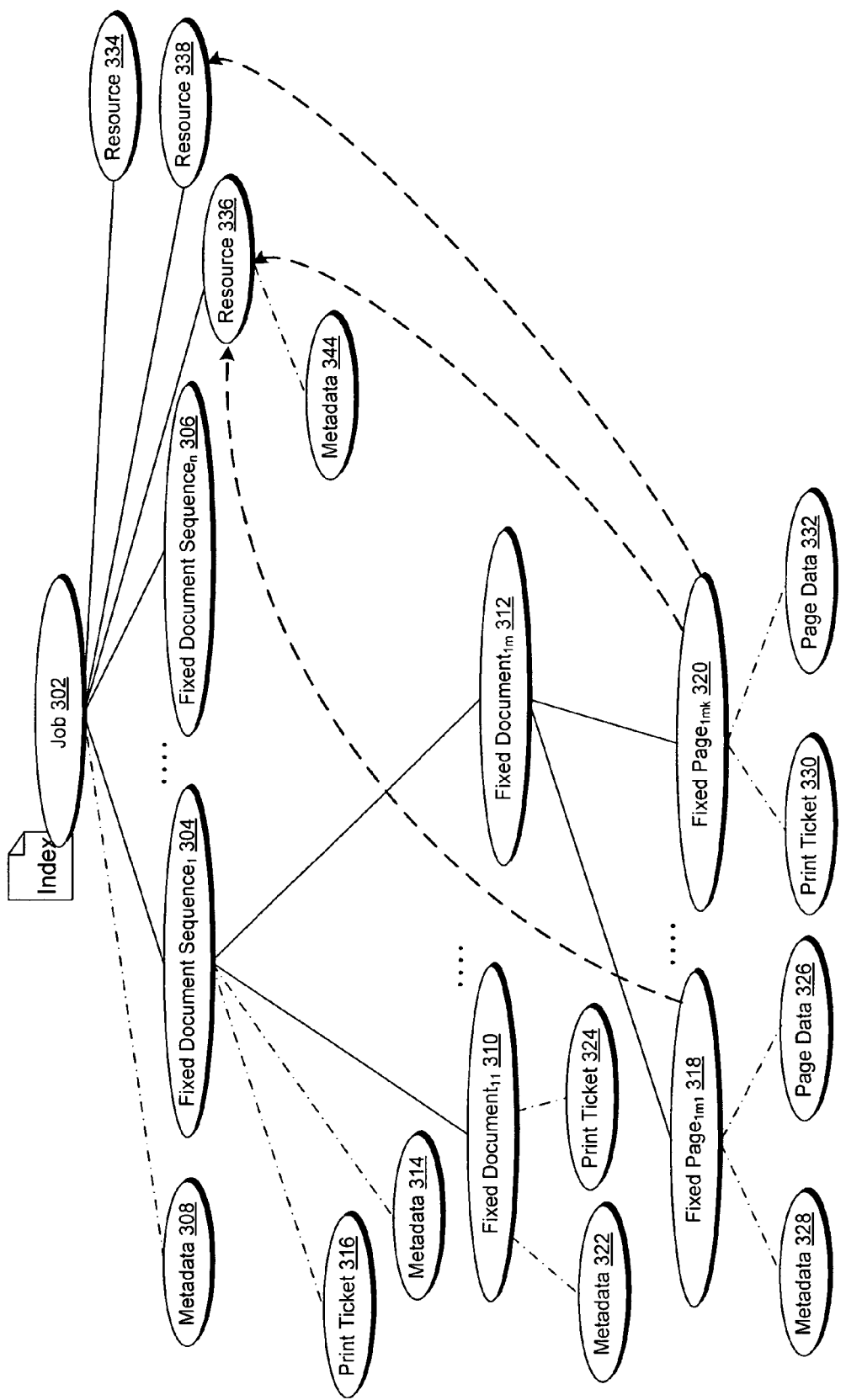
FIG. 3 shows one exemplary instantiation of the schema of FIG. 2.

To further clarify the exemplary schema 200, FIG. 3 shows one exemplary instantiation 300 of the schema 200. The entire collection of nodes shown in FIG. 3 defines a package. The package includes a root node 302 associated with the entire package, e.g., the entire job. These different nodes in the package are also referred to herein as different "parts" of the package or job.

Some of the nodes in the package are also referred to as being "fixed", such as the fixed document sequence nodes and the fixed document nodes. A fixed node refers to a node that is already laid out properly for rendering and that has static content. A fixed page node or fixed page refers to a fixed layout, static content page. A fixed document node or fixed document refers to a fixed layout, static content document composed of fixed pages. A fixed document sequence node or fixed document sequence refers to a fixed layout, static content document sequence composed of fixed documents. For example, a fixed document node refers to a document that is already laid out properly for printing on a particular size of paper (e.g., letter size, A4 size, legal size, postcard size, etc.)—the organization of text and/or graphics on the page has already been determined for the particular size of paper on which the job is to be printed. This layout for the job is determined when the structured job information 102 is created, and is typically created by the same component or module as creates the structured job information 102 (e.g., the interface functionality 114 or the application module 110 of FIG. 1).

An index can be associated with the package, and hence with the root node 302. This index can be used to locate the package in the spool storage 112.

The job defined by the root node 302 includes a number of fixed document sequences, as identified by fixed document sequence node 304 and fixed document sequence node 306. Also, a metadata node 308 is associated with the root node 302. If so configured, the metadata node 308 associated with the root node (job node) 302 defines properties which apply to the job as a whole.

Each of the fixed document sequences associated with nodes 304 and 306 can include multiple fixed documents associated therewith. For example, the fixed document sequence represented by node 304 includes at least two fixed documents identified by nodes 310 and 312.

In addition to fixed document nodes (310, 312), node 304 also includes nodes 314 and 316 associated therewith. Node 314 specifies metadata associated with node 304 and node 304 specifies a print ticket associated with node 304.

Each fixed document includes one or more fixed pages associated therewith. Nodes 318 and 320, for example, represent fixed pages associated with fixed document node 312. Metadata node 322 indicates that metadata can be associated with the document level of the hierarchy (as it can for any level). Print ticket node 324 indicates that resource information can be associated with the document level (as it can for any level).

Finally, each fixed page can include page data associated therewith as well as metadata and a print ticket. For example, fixed page node 318 includes page data node 326 and metadata node 328 associated therewith, indicating that page data and metadata can be associated with this page. Page node 320 includes print ticket node 330 and page data node 332 associated therewith, indicating that a print ticket and page data can be associated with this page.

The package associated with root node 302 can also include a collection of resources. These resources are associated with root node 302, but can be referenced or used by different nodes in the job. Such collection of resources thus defines a shared library of resources that can be applied at different points within a document represented by the package. However, this shared library of resources remains associated with a single node, and thus all resources can be maintained in a single location (e.g., a single folder or directory) associated with the single node, even though they are referenced by different nodes in the job. Nodes 334, 336, and 338, for example, represent resources associated with job node 302. Resources can be, for example, image resources, font resources, or other types of resources. Image resources are images that can be used or referenced by different nodes in the job, while font resources are fonts that can be used or referenced by different nodes in the job. A metadata node 344 depends from the resource node 336, which represents metadata that applies the resource node 336.

Metadata can be associated with individual nodes in the hierarchical structure 108 in different ways. For instance, individual nodes can provide linking information that points to associated metadata, or the nodes themselves can embed such metadata as integral parts of the nodes, and so forth.

As discussed above, the different nodes in a package are also referred to as parts of the package or job. An individual part includes common properties (e.g., name and content type) and a stream of bytes. Part names are organized into a hierarchy, similar to paths on a file system. This hierarchy is composed of segments delineated by slashes. The last segment of the name is similar to a filename in a traditional file system. The segments of the names of all parts in a package form a tree.

Alternatively, the job (302) may be collapsed into the fixed document sequence so that the fixed document sequence (e.g., node 304 or 306) is the root of the hierarchy. In such situations, job node 302 would not be included in the hierarchy, and resource nodes would be associated with the fixed document sequence node that is the root of the hierarchy (although the resource nodes could be referenced by other non-root nodes of the hierarchy).

Parts can reference or be related to other parts using Uniform Resource Identifiers (URIs) or other linking mechanisms. In certain exemplary embodiments, three different types of references or relations are defined: spines, references, and relationships. A spine (or spine reference) refers to a reference from a source part that identifies a target part, where both the source and target parts are fixed (e.g., references from a fixed document sequence to fixed documents, and references from fixed documents to fixed pages). Spines are indicated in FIG. 3 by a solid line. The source part of the spine is typically made up of only spine references to other parts—there is typically no additional text and/or graphic data associated with the source part. Spines can be represented using the Extensible Markup Language (XML).

A reference is similar to a spine, but the source and target parts need not be fixed and the target part is a resource. Any document-related node in the package can reference any resource node, indicating that a particular element or aspect of the document is referencing a particular resource for use thereat. This reference can be made even though the resources are associated with only the root nodes. For instance, in the exemplary case of FIG. 3, fixed page node 318 references resource node 336. This reference is indicated in FIG. 3 with a dashed line terminating with an arrow head. This means that the resource represented by node 336 is used in the page represented by fixed page node 318. Further, fixed page node 320 references resource nodes 336 and 338, indicting that the resource associated with node 336 and the resource associated with node 338 are used in the page associated with node 320. These references are indicated by two respective dashed lines. References can be represented using XML.

Relationships provide a way to associate nodes with metadata. Any node can be a source node, and a metadata node is the target node. Relationships allow this association to be represented without modifying the parts. As such, relationships make the connections between parts directly "discoverable" without examining the content in the parts. This makes the connections independent of content-specific schema, and also allows the connections to be resolved more quickly. Relationships are indicated in FIG. 3 by an alternating dot-dash line.

Relationships can be represented using XML using relationship parts. Namely, each part in the job information 102 that is the source of one or more relationships has an associated relationship part. This relationship part holds the list of relationships for the source part (e.g., expressed in XML using a content type application/vnd.ms-metro.relationships+xml).

Different strategies can be used to link the elements together to form the hierarchies shown in FIGS. 2 and 3. In one technique, the individual elements can be modified so that they point to linked objects (e.g., parent and child objects). Linking can be provided by pointers, Uniform Resource Locators (URLs), or some other referencing mechanism. Alternatively, or in addition, separate relationship information can be defined that specifies how separate elements are linked together. This separate relationship information thus serves as a blueprint for linking together separate objects in the job information. Among other implementations, the Extensible Markup Language (XML), or other markup language, can be used, in whole or in part, to specify the elements in the hierarchies shown in FIGS. 2 and 3 and the relationships among these elements.

Specific examples of XML code that specify elements in the hierarchies shown in FIGS. 2 and 3 are illustrated in Tables I through IV below.

Table I illustrates an example of XML code that specifies a fixed document sequence node. Fixed document nodes are child nodes of a fixed document sequence node. These child nodes are referenced from the fixed document sequence node as spine references. Fixed document nodes are referenced using a <DocumentReference> element and a source attribute that specifies the URI of the fixed document part being referenced.

TABLE I

| 1 | <FixedDocumentSequence xmlns= "schemas.microsoft.com/metro/2005/02/rp"> |
| 2 | <DocumentReference Source="FixedDoc1"/> |
| 3 | <DocumentReference Source="FixedDoc2"/> |
| 4 | </FixedDocumentSequence> |

As seen in line 1 of the example XML of Table I, the fixed document sequence node identifies a namespace that is used to specify the elements of the hierarchies shown in FIGS. 2 and 3. Lines 2 and 3 each include a <DocumentReference> element that identifies a particular fixed document that is part of the fixed document sequence ("FixedDoc1" in line 2, and "FixedDoc2" in line 3).

Table II illustrates an example of XML code that specifies a fixed document node. The fixed document node identifies one or more fixed page nodes. The fixed document node can include one or more <FixedDocument> elements as well as one or more <PageContent> elements. The <FixedDocument> element logically binds an ordered sequence of pages together into a single multi-page document.

The <PageContent> element is the child element of the <FixedDocument> element. Each <PageContent> element refers to the source of the content for a single page (that is, to a fixed page node). Each <PageContent> element may optionally include a height and width attribute reflecting the size of a single page. The required page size is specified in the fixed page part; the optional size on <PageContent> is advisory only. The <PageContent> size attributes allow applications such as viewers to make visual layout estimates for content quickly, without loading and parsing all of the individual fixed page parts.

TABLE II

| 1 | <FixedDocument xmlns="http://schemas.microsoft.com/metro/2005/02/rp"> |
| 2 | <PageContent Source="../FixedPages/FixedPage__1.xaml"></PageContent> |
| 3 | <PageContent Source="../FixedPages/FixedPage__2.xaml"></PageContent> |
| 4 | <PageContent Source="../FixedPages/FixedPage__3.xaml"></PageContent> |
| 5 | <PageContent Source="../FixedPages/FixedPage__4.xaml"></PageContent> |
| 6 | <PageContent Source="../FixedPages/FixedPage__5.xaml"></PageContent> |
| 7 | <PageContent Source="../FixedPages/FixedPage__6.xaml"></PageContent> |
| 8 | </FixedDocument> |

As seen in line 1 of the example XML of Table II, the fixed document node identifies a namespace that is used to specify the elements of the hierarchies shown in FIGS. 2 and 3. Lines 2-7 each include a <PageContent> element that identifies a particular fixed page that is part of the fixed document (e.g., "FixedPage__1 in line 2, "FixedPage__2" in line 3, and so forth).

Table III illustrates an example of XML code that specifies a fixed page node. Each fixed page node represents the content of a page in a <FixedPage> element with <Path> and <Glyphs> elements, using the <Canvas> element to group them. The <Path> and <Glyphs> elements are together the base for all marks rendered on a FixedPage. The <Path> element has a region and a fill. A path is described by specifying a Geometry.Data child element and the rendering attributes, such as fill or opacity. The <Glyphs> element is used to represent a run of text, all from the same font. The <Glyphs> element provides information for accurate rendering, as well as supporting search and selection features in viewers.

The <Canvas> elements, <Path> elements, and <Glyph> elements include references to a brush or brush element. A brush can be used, for example, to paint the interior of geometric shapes defined by a <Path> element, to fill the character outlines rendered with a <Glyphs> element, and to define the alpha-transparency mask in opacity mask attributes. Examples of brush elements include a <SolidColorBrush> element, an I<ImageBrush> element, a <VisualBrush> element, a <LinearGradientBrush> element, and a <RadialGradientBrush> element.

The <SolidColorBrush> element fills defined geometric regions with a solid color. The <SolidColorBrush> element can include one or more of an opacity attribute, a transform attribute, and a color attribute. The opacity attribute specifies uniform transparency of the brush fill, for example ranging from 0 (fully transparent) to 1 (fully opaque). The transform attribute describes a matrix transform applied to the brush's coordinate space. The transform property on a brush is concatenated with the current effective render transform to yield an effective render transform local to the brush. The color attribute specifies a color for filled elements, such as an sRGB color value specified as 6-digit hexadecimal number or an sARGB color value specified as 8-digit hexadecimal number.

The <SolidColorBrush> element can have a transform element as a child The transform element specifies the transformation that is applied to the brush. This transformation is applied after the brush's output has been mapped and positioned.

The <ImageBrush> element can be used to fill a space with an image. The <ImageBrush> element can include one or more of an opacity attribute, a transform attribute, a view box attribute, a view port attribute, a stretch attribute, a tile mode attribute, a view box units attribute, a view port units attribute, and a bitmap source attribute. The opacity attribute specifies uniform transparency of the brush fill, for example ranging from 0 (fully transparent) to 1 (fully opaque). The transform attribute describes a matrix transform applied to the brush's coordinate space. The transform property on a brush is concatenated with the current effective render transform to yield an effective render transform local to the brush. The view box attribute specifies a new coordinate system for the contents—it redefines the extent and origin of the view port. The view box is expressed as a list of four 'unitless' (real) numbers <min-x>, <min-y>, <width> and <height>, separated by commas. The dimensions specified in the view box attribute are relative to the image's physical dimensions (e.g., expressed in units of $1/96$ of an inch). The image's physical dimensions are calculated by dividing the image's horizontal dimension in pixels by the horizontal image resolution and the image's vertical dimension in pixels by the vertical image resolution.

The view port attribute specifies a coordinate system in which to position contents. The view port is expressed as a list of four real numbers <min-x>, <min-y>, <width> and <height>, separated by commas. The rectangle defined by the view port is specified in user coordinates and defines the brush tile that is repeatedly applied to fill a Path. The stretch attribute specifies how the contents of a view box are mapped to a view port. The tile mode attribute specifies how contents will be tiled in the filled region. The view box units attribute specifies the relation of view box coordinates to coordinates of the image as absolute. The view port units attribute specifies the relation of view port coordinates to current user coordinates as absolute. The bit map source attribute specifies the URI of an image resource that can be used as the image to fill the space.

The <ImageBrush> element can have a transform element as a child. The transform element describes a matrix transform applied to the brush's coordinate space. The Transform property on a brush is concatenated with the current effective render transform to yield an effective render transform local to the brush. The view port for the brush is then transformed using that local effective render transform.

The <VisualBrush> element can be used to fill a space with a vector drawing. The drawing can be specified as a child element of the <VisualBrush> element, or as a resource reference. The <VisualBrush> element can include one or more of an opacity attribute, a transform attribute, a view box attribute, a view port attribute, a stretch attribute, a tile mode attribute, a view box units attribute, and a view port units attribute. These attributes are analogous to those discussed above with respect to the <ImageBrush> element.

The <VisualBrush> element can have a transform element and/or a visual element as a child. The transform element describes a matrix transform applied to the brush's coordinate space. The Transform property on a brush is concatenated with the current effective render transform to yield an effective render transform local to the brush. The view port for the brush is then transformed using that local effective render transform. The visual element is a generic definition of an element that could be displayed on a surface.

The <LinearGradientBrush> element can be used to fill a region with a linear gradient. The <LinearGradientBrush> element can include one or more of an opacity attribute, a transform attribute, a color interpolation mode attribute, a spread method attribute, a mapping mode attribute, a start point attribute, and an end point attribute. The opacity attribute specifies uniform transparency of the linear gradient, for example ranging from 0 (fully transparent) to 1 (fully opaque). The transform attribute describes a matrix transform applied to the coordinate space of the linear gradient.

The color interpolation mode attribute specifies the gamma space for color interpolation for non-extended sRGB colors. For extended colors, only linear color interpolation (no gamma) is typically used. The spread method attribute specifies how the brush should fill the content area outside of the primary, initial gradient area. The mapping mode attribute specifies an absolute interpretation of the coordinates specified by the start point and end point attributes. The start point attribute specifies a start point of the linear gradient. The end point attribute specifies the end point of the linear gradient. The linear gradient brush interpolates the colors from the start point to the end point (e.g., where the start point represents offset 0 and the end point represents offset 1). The offset attribute value specified in a gradient stop element relates to the offsets defined by the start point and the end point.

The <LinearGradientBrush> element can have a gradient stops element as a child. The gradient stops element holds a sequence of gradient stop elements that are sorted in ascending order by an offset attribute value, maintaining the relative order of GradientStops with the same Offset attribute value.

The <RadialGradientBrush> element can be used to fill a region with a radial gradient. The <RadialGradientBrush> element is similar to the <LinearGradientBrush> element, however, whereas the linear gradient has a start and end point to define the gradient vector, the radial gradient has an ellipse along with a gradient origin to define the gradient behavior. The ellipse defines the end point of the gradient—in other words, a gradient stop at 1.0 defines the color at the circumference of the ellipse. The gradient origin defines the center of the gradient. A gradient stop at 0.0 defines the color at the gradient origin.

The <RadialGradientBrush> element can have can include one or more of an opacity attribute, a transform attribute, a color interpolation mode attribute, a spread method attribute, a mapping mode attribute, a center attribute, a gradient origin attribute, a radius X attribute, and a radius Y attribute. The opacity attribute specifies uniform transparency of the radial gradient, for example ranging from 0 (fully transparent) to 1 (fully opaque). The transform attribute describes a matrix transform applied to the coordinate space of the radial gradient.

The color interpolation mode attribute specifies the gamma space for color interpolation for non-extended sRGB colors. For extended colors, only linear color interpolation (no gamma) is typically used. The spread method attribute specifies how the brush should fill the content area outside of the primary, initial gradient area. The mapping mode attribute specifies an absolute interpretation of the coordinates specified by the center, gradient origin, radius X, and radius Y attributes.

The center attribute specifies the center of the radial gradient (e.g., the center of the ellipse). The radial gradient brush interpolates the colors from the gradient origin to the circumference of the ellipse. The circumference is determined by the center and the radii. The gradient origin attribute specifies the origin point of the radial gradient. The radius X attribute specifies the radius in the X dimension of the ellipse which defines the radial gradient. The radius Y attribute specifies the radius in the Y dimension of the ellipse which defines the radial gradient.

The <RadialGradientBrush> element can have a gradient stops element as a child. The gradient stops element holds a sequence of gradient stop elements that indicate a location and range of color progression for rendering a gradient.

The <Canvas> element is used to group elements together. Typically, elements of a fixed page node are grouped together in a <Canvas> element when they share a composed common attribute (e.g., opacity, clip, render transform, opacity mask, etc.). By grouping these elements together in a <Canvas> element, common attributes can often be applied to the canvas instead of to the individual elements.

The <Canvas> element can include one or more of a render transform attribute, a clip attribute, an opacity attribute, an opacity mask attribute, an ID attribute, and a navigate URI attribute. The render transform attribute specifies a new coordinate frame for the child elements of the <Canvas> element, such as another <Canvas> element. The clip attribute specifies the region to which a brush can be applied by the child elements of the <Canvas> element. The opacity attribute specifies uniform transparency of the canvas, for example ranging from 0 (fully transparent) to 1 (fully opaque).

The opacity mask attribute specifies a mask of alpha values that is applied in the same fashion as the opacity attribute, but allows different alpha value on a pixel-by-pixel basis. The ID attribute contains a string value that is used to identify the current element as a named, addressable point in the document for purposes of hyperlinking into the current document. The navigate URI attribute is used to associate a hyperlink URI with the element. This may be a relative or absolute URI addressing a resource external to the 19 package or internal to the package.

The <Canvas> element can have a resources element, a render transform element, a clip element, and/or an opacity mask element as a child (children). The resources element specifies one or more resources for the <Canvas> element. The render transform element establishes a new coordinate frame for the children elements of the <Canvas> element. The clip element describes the region to which a brush can be applied by the children elements of the <Canvas> element. The opacity mask element specifies a mask of alpha value that is applied in the same fashion as the opacity attribute, but allow different alpha values on a pixel-by-pixel basis.

The <Path> element can include one or more of a data attribute, a fill attribute, a fill rule attribute, a render transform attribute, a pen attribute, a clip attribute, an opacity attribute, an opacity mask attribute, an ID attribute, and a navigate URI attribute. The data attribute specifies the geometry of the path. The fill attribute specifies the brush used to paint the geometry of the path. The fill rule attribute specifies how intersecting areas of geometric shapes are combined to form a region. The render transform attribute specifies a new coordinate frame for the children elements of the path, such as the geometry defined by Path.Data.

The pen attribute specifies a Brush used to fill the pixels of the stroke. The clip attribute specifies the region to which a brush can be applied by the path's geometry. The opacity attribute specifies uniform transparency of the filled path, for example ranging from 0 (fully transparent) to 1 (fully opaque). The opacity mask attribute specifies a mask of alpha values that is applied to the glyphs in the same fashion as the opacity attribute, but allows different alpha value for different areas of the surface. The ID attribute contains a string value that is used to identify the current element as a named, addressable point in the document for purposes of hyperlinking into the current document. The navigate URI attribute is used to associate a hyperlink URI with the element. This may be a relative or absolute URI addressing a resource external to the package or internal to the package.

The <Path> element can have a render transform element, a clip element, an opacity mask element, a fill element, a stroke element, and/or a data element as a child (children). The render transform element establishes a new coordinate frame for the children elements of the path, such as the geometry defined by a data element. The clip element describes the region to which a brush can be applied by the path's geometry. The opacity mask element specifies a mask of alpha values that is applied in the same fashion as the opacity attribute, but allow different alpha values on a pixel-by-pixel basis. The fill element describes the brush used to paint the path's geometry. The stroke element specifies a brush used to fill the pixels of the stroke. The data element describes the path's geometry.

The <Glyph> element can include one or more of a bidi level attribute, a caret stops attribute, a device font ID attribute, a fill attribute, a font rendering size attribute, a font URI attribute, an origin X attribute, an origin Y attribute, a sideways attribute, an indices attribute, a Unicode string attribute, a style simulations attribute, a render transform attribute, a clip attribute, an opacity attribute, an opacity mask attribute, an ID attribute, and a navigate URI attribute. The bidi level attribute specifies the Unicode algorithm bidirectional nesting level, where numerically even values imply left-to-right layout, numerically odd values imply right-to-left layout. The caret stops attribute specifies the positions within the sequence of 'UnicodeString' characters at which a text-selection tool may place a text-editing caret. The device font ID attribute specifies an identifier (e.g., a globally unique ID or GUID) for a specific device font. The fill attribute specifies the brush used to paint the glyph outlines. The font rendering size attribute specifies the font size in drawing surface units (e.g., 1/96 of an inch).

The font URI attribute specifies the physical font from which all glyphs in this run are drawn. The origin X attribute specifies the X coordinate of first glyph in the run (e.g., in 1/96 of an inch). The origin Y attribute specifies the Y coordinate of first glyph in run (e.g., in 1/96 of an inch). The sideways attribute is a flag specifying whether a glyph is turned on its side. The indices attribute specifies a series of glyph indices and their attributes representing this glyph run.

The Unicode string attribute specifies an array of characters represented by this glyph run. The style simulations attribute specifies the style simulation (e.g., italic, bold, bold italic, etc.). The render transform attribute specifies a new coordinate frame for the glyph run specified by the <Glyphs> element. The clip attribute specifies the region to which a brush can be applied to the outline of a glyph. The opacity attribute specifies uniform transparency of the filled glyph outlines, for example ranging from 0 (fully transparent) to 1 (fully opaque). The opacity mask attribute specifies a mask of alpha values that is applied to the glyphs in the same fashion as the opacity attribute, but allows different alpha value for different areas of the surface. The ID attribute contains a string value that is used to identify the current element as a named, addressable point in the document for purposes of hyperlinking into the current document. The navigate URI attribute is used to associate a hyperlink URI with the element. This may be a relative or absolute URI addressing a resource external to the package or internal to the package.

A fixed page node includes height and width attributes specifying the height and width of the page (e.g., in 1/96 of an inch), as well as an xml:lang attribute specifying the language of the page (e.g., English, French, Japanese, etc.). A fixed page node may also reference one or more resources. A fixed page node may also optionally include a content box attribute, a bleed box attribute, and/or a render transform attribute. A content box attribute specifies which area of the page contains imageable content that is to be fit on the imageable area when printing or viewing the page. A bleed box attribute specifies the area which includes printing-related crop-marks that may be outside of the physical page. A render transform attribute specifies a new coordinate frame for the children of the fixed page node.

The <Glyphs> element can have a render transform element, a clip element, an opacity mask element, and/or a fill element as a child (children). The render transform element establishes a new coordinate frame for the glyph run specified by the <Glyphs> element. The clip element describes the region to which a brush can be applied to the outline of a glyph. Only portions of the <Glyphs> element that fall within the clip region, even partially clipped characters, produce marks on the page. The opacity mask element specifies a mask of alpha values that is applied to the glyphs in the same fashion as the opacity attribute, but allows different alpha values for the different areas of the surface. The fill element describes the brush used to paint the glyph outlines.

TABLE III

| | |
|---|---|
| 1 | <FixedPage xmlns="schemas.microsoft.com/winfx/avalon/2005" xmlns:x="schemas.microsoft.com/winfx/xaml/2005" Width="816" Height="1056" Background="#FFFFFFE0"> |
| 2 | FixedPage.Resources> |
| 3 | LinearGradientBrush x:Key="b0" StartPoint="0.666666666666667, 0.666666666666667" EndPoint="47.192, 24.1466666666667" ColorInterpolationMode="SRgbLinearInterpolation" MappingMode="Absolute" SpreadMethod="Pad"> |
| 4 |     <GradientStopCollection> |
| 5 |         <GradientStop Color="#20000000" Offset="0" /> |
| 6 |         <GradientStop Color="#00FFFFFF" Offset="0.5" /> |
| 7 |         <GradientStop Color="#80FFFFFF" Offset="1" /> |
| 8 |     </GradientStopCollection> |
| 9 |   </LinearGradientBrush.GradientStops> |
| 10 | </LinearGradientBrush> |
| 11 | <LinearGradientBrush x:Key="b1" StartPoint="58.8233333333333, 17.7633333333333" EndPoint="58.8233333333333, 23.7633333333333" ColorInterpolationMode="SRgbLinearInterpolation" MappingMode="Absolute" SpreadMethod="Pad"> |
| 12 |   <LinearGradientBrush.GradientStops> |
| 13 |     <GradientStopCollection> |
| 14 |         <GradientStop Color="#00FFFFFF" Offset="0.5" /> |
| 15 |         <GradientStop Color="#35592F00" Offset="1" /> |
| 16 |     </GradientStopCollection> |
| 17 |   </LinearGradientBrush.GradientStops> |
| 18 | </LinearGradientBrush> |
| 19 | <LinearGradientBrush x:Key="b2" StartPoint="110.596666666667, 12.4066666666667" EndPoint="116.596666666667, 12.4066666666667" ColorInterpolationMode="SRgbLinearInterpolation" MappingMode="Absolute" SpreadMethod="Pad"> |
| 20 |   <LinearGradientBrush.GradientStops> |
| 21 |     <GradientStopCollection> |
| 22 |         <GradientStop Color="#00FFFFFF" Offset="0.5" /> |
| 23 |         <GradientStop Color="#28592F00" Offset="1" /> |
| 24 |     </GradientStopCollection> |
| 25 |   </LinearGradientBrush.GradientStops> |
| 26 | </LinearGradientBrush> |
| 27 | </FixedPage.Resources> |
| 28 | ...<br><Glyphs OriginX="0" OriginY="32.59" FontRenderingEmSize="36" FontUri="/Resources/Fonts/Font_1.ttf" UnicodeString="TopLeft" Fill="#00008B" /><!--System.Windows.Controls.TextBlock--><Glyphs OriginX="0" OriginY="49.9033333333333" FontRenderingEmSize="56" FontUri="/Resources/Fonts/Font_2.ttf" UnicodeString="BottomRight" Fill="#FFE4C4"><Glyphs.RenderTransform><MatrixTransform Matrix="1,0,0,1,520,750" /></Glyphs.RenderTransform></Glyphs><!--System.Windows.Controls.TextBlock--><br>...<br><Path Fill="#FF0000"><Path.RenderTransform><MatrixTransform Matrix="1,0,0,1,150,150" /></Path.RenderTransform><Path.Data><PathGeometry FillRule="EvenOdd"><PathFigure><StartSegment Point="0, 0" /><PolyLineSegment Points="300, 0 300, 300 0, 300" /><CloseSegment /></PathFigure></PathGeometry></Path.Data></Path><br><Canvas><Canvas.RenderTransform><MatrixTransform Matrix="1,0,0,1,80,250" /></Canvas.RenderTransform><!-- Microsoft.Windows.Themes.ThickChrome--><Canvas Clip="M 0, L 117.65, 0 117.65, 24.81 0, 24.81Z"><Path Stroke="{StaticResource b0}" StrokeThickness="1.3333333333" StrokeMiterLimit="10" Data="M 0.67, 3.67 C 0.67, 2.01 2.01, 0.67 3.67, 0.67 L 113.98, 0.67 C 115.64, 0.67 116.98, 2.01 116.98, 3.67 L 116.98, 21.15 C 116.98, 22.8 115.64, 24.15 113.98, 24.15 L 3.67, 24.15 C 2.01, 24.15 0.67, 22.8 0.67, 21.15Z" /><Path Fill="FFFFE0" Data="M 0.75, 4.75 C 0.75, 2.54 2.54, 0.75 4.75, 0.75 L 112.9, 0.75 C 115.11, 0.75 116.9, 2.54 116.9, 4.75 L 116.9, 20.06 C 116.9, 22.27 115.11, 24.06 112.9, 24.06 L 4.75, 24.06 C 2.54, 24.06 0.75, 22.27 0.75, 20.06Z" /><Path Fill="{StaticResource b1}" Data="M 1.05, 20.76 C 1.05, 19.11 2.84, 17.76 5.05, 17.76 L 112.6, 17.76 C 114.81, 17.76 116.6, 19.11 116.6, 20.76 L 116.6, 20.76 C 116.6, 22.42 114.81, 23.76 112.6, 23.76 L 5.05, 23.76 C 2.84, 23.76 1.05, 22.42 1.05, 20.76Z" /><Path Fill="{StaticResource b2}" Data="M 110.6, 5.05 C 110.6, 2.84 111.94, 1.05 113.6, 1.05 L 113.6, 1.05 C 115.25, 1.05 116.6, 2.84 116.6, 5.05 L 116.6, 19.76 C 116.6, 21.97 115.25, 23.76 113.6, 23.76 L 113.6, 23.76 C 111.94, 23.76 110.6, 21.97 110.6, 19.76Z" /><br>...<br></Canvas> |
| 29 | </FixedPage> |

As seen in line 1 of the example XML of Table III, the fixed page node identifies a height and width of the page, a background for the page (e.g., background color and/or pattern), as well as the namespace that is used to specify the elements of the hierarchies shown in FIGS. 2 and 3. In lines 2-27, various different brushes are defined. In line 28, which is actually multiple lines, various glyphs, paths, and canvas elements are defined.

Table IV illustrates an example of XML code that specifies a print ticket node. Various different parameters can be included in a print ticket node to specify how the associated node (e.g., fixed document node, fixed page node, etc.) is to be processed. Examples of these are illustrated in the example XML code of Table IV.

TABLE IV

```
1   <?xml version="1.0" encoding="UTF-8"?>
2   <psf:PrintTicket
    xmlns:psf="schemas.microsoft.com/windows/2003/08/printing/printsc
    hemaframework" xmlns:xsi="www.w3.org/2001/XMLSchema-
    instance"
    xmlns:xsd="www.w3.org/2001/XMLSchema" version="1"
    xmlns:psk="schemas.microsoft.com/windows/2003/08/printing/
    printschemakeywords">
3   ...
4     <psf:Feature name="psk:JobCollate">
5       <psf:Option name="psk:Collated" />
6     </psf:Feature>
7     <psf:Feature name="psk:PageOutputColor">
8       <psf:Option name="psk:Monochrome" />
9     </psf:Feature>
10    <psf:Feature name="psk:PageOrientation">
11      <psf:Option name="psk:Portrait" />
12    </psf:Feature>
13    <psf:Feature name="psk:PageMediaSize">
14      <psf:Option name="psk:NorthAmericaLetter">
15        <psf:ScoredProperty name="psk:MediaSizeX">
16          <psf:Value xsi:type="xsd:integer">215900</psf:Value>
17        </psf:ScoredProperty>
18        <psf:ScoredProperty name="psk:MediaSizeY">
19          <psf:Value xsi:type="xsd:integer">279400</psf:value>
20        </psf:ScoredProperty>
21      </psf:Option>
22    </psf:Feature>
23  ...
24  </psf:PrintTicket>
```

As seen in line 1 of the example XML of Table IV, the print ticket node identifies a version of XML and a data encoding format used by the print ticket node. Line 2 identifies the namespaces that are used to specify the elements of the hierarchies shown in FIGS. 2 and 3. Lines 4-6 identify a job collate feature, indicating that the pages being printed should be collated. Lines 7-9 identify an output color feature, indicating that the pages should be printed in monochrome. Lines 10-12 identify a page orientation feature, indicating that the pages should be printed in portrait mode. Lines 13-22 identify a media size feature, indicating the size of the media on which the pages will be printed.

As noted above, the nodes shown in FIG. 3 are logical entities. Mapping rules define how the logical nodes map to parts of actual physical storage (e.g., in spool storage 112). A logical package may be "physically" embodied by a collection of loose files, a .ZIP file archive, a compound file, or some other format. In one case, some of the nodes directly correspond, in one-to-one fashion, to parts (e.g., files) stored in the spool storage 112, such as pages, image resources, font resources, etc. Other nodes may not map, in one-to-one fashion, to actual parts of the spool storage 112.

Figure 4:
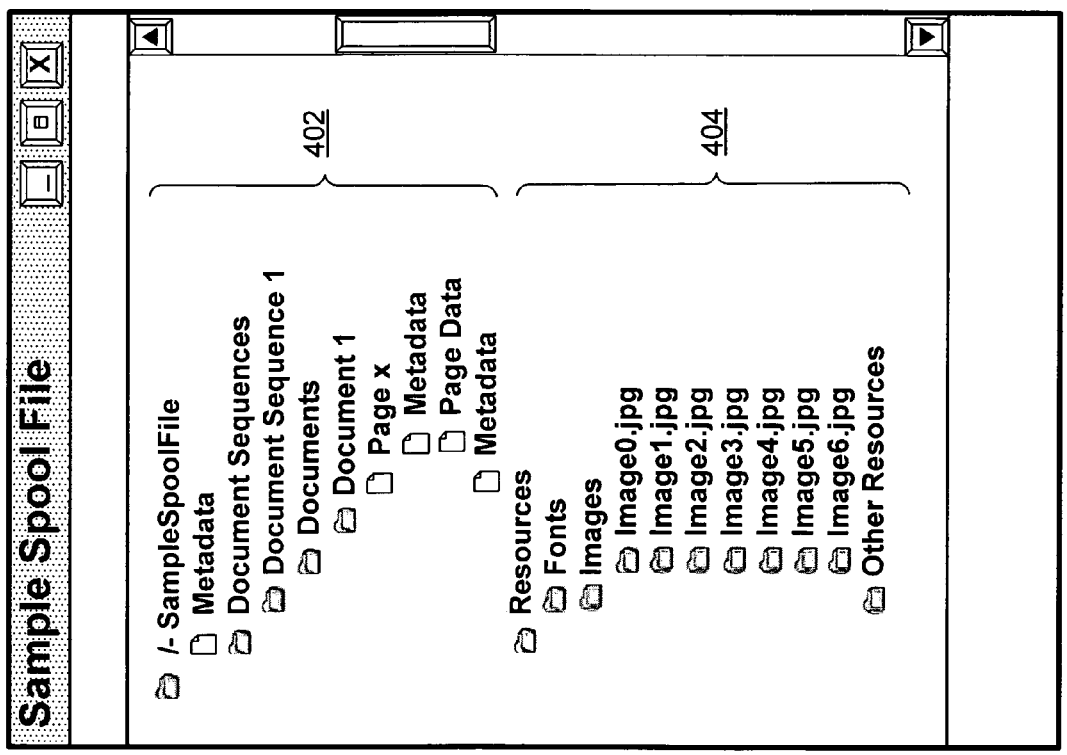
FIG. 4 shows an example of a collection of files associated with a single job.

FIG. 4 shows an example of a collection of files 400 associated with a single job (e.g., a single package). A container is defined by a package that is stored together as an integral unit, such as an integral composite file having individual component files. This is the case in FIG. 4. A first series of entries 402 in the file structure corresponds to the document-related nodes (e.g., metadata nodes, fixed document sequence nodes, fixed document nodes, etc.) shown in FIG. 3 (although FIG. 4 is not otherwise related to the example of FIG. 3). A second series of entries 404 in the file structure correspond to the resource-related nodes (e.g., resource nodes, image nodes, etc.) shown in FIG. 3. The document-related entries 402 include a general folder ("SampleSpoolFile") associated with a root node of the entire package. Metadata is associated with this node. The package includes a "Document Sequences" folder, which in turn includes a "Document Sequence 1" folder, which in turn includes a "Documents," folder, which in turn includes a "Document 1" folder, which in turn includes a file labeled "Page x." These entries correspond to the hierarchy of nodes in FIG. 3 from root node to page node. A metadata file and a page data file are associated with the "Page x" file. Another metadata file is provided which applies to all of the entries of the Document 1 folder.

The second series of entries 404 includes separate folders for font resources, image resources, other resources, etc. As the resources are associated with the root node, the resources folder is in the "SampleSpoolFile" folder. The image folder is expanded to show an exemplary series of seven .jpg image files. These image files define shared image resources that can be referenced by any page-related node in the package. For example, the metadata information stored in the files can make reference to these resources, effectively linking specific nodes to specific resources.

Whatever the form of the physical media and file structure, information can be stored on this media in simple (direct) ordered fashion, in interleaved fashion, or some other fashion. Information can be retrieved from this physical media in sequential mode or random access mode or some other mode.

B. Exemplary Method of Operation

Figure 5:
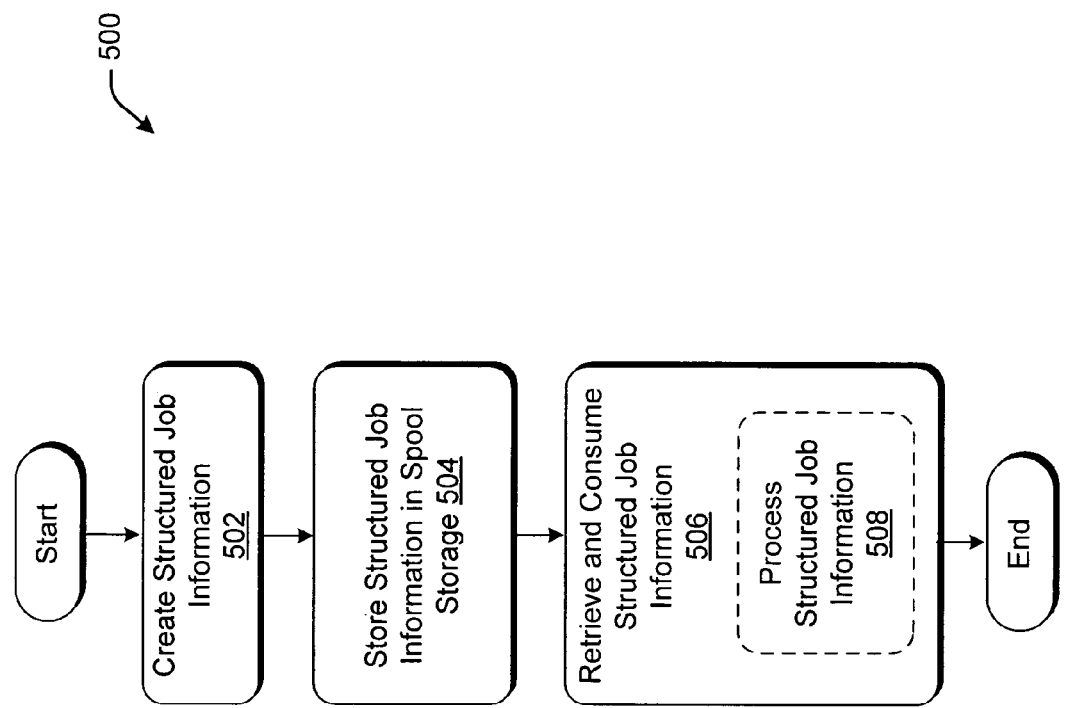
FIG. 5 is a flowchart showing an example of operation of the system of FIG. 1.

FIG. 5 describes the operation of the system 100 of FIG. 1 in flow chart form. To facilitate discussion, certain operations are described as constituting distinct acts performed in a certain order. Such implementations are exemplary and non-limiting. Certain acts described herein can be grouped together and performed in a single operation, and certain acts can be performed in an order that differs from the order employed in the examples set forth in this disclosure.

The procedure 500 includes generating the job information 102 having the structure 108 (act 502). To perform this task, the application module 110 can generate job data, and the APIs 114 (and possibly the spooling module 116) can produce the job information 102 having the format 108. This generated job information, having the format 108, is stored in the spool storage 112 (act 504).

The job information 102 is subsequently retrieved from the spool storage 112 and consuming this job information 102 using the spooling module 116 (act 506). Such consumption may entail applying different combinations of processing operations provided by individual filters (132, 134, . . . 136). Any such processing of job information 102 is represented generally by act 508. The processing may entail converting the job information 102 having the structure 108 to processed job information 102 that still maintains the structure 108. This output result would be appropriate to send to the "structure-aware" target entity 118 which can interpret this structure 108. The processing may alternatively entail converting the job information 102 having the structure 108 into job information that no longer has any semblance to the structure 108. This output result would be appropriate to send to the "structure-unaware" target entity 120. Or the processing may entail converting the job information 102 having the structure 108 to processed job information 102 that has some vestiges of the structure 108, but which deviates from the structure in one or more respects. This output result would be appropriate to send to the "partially structure-aware" target entity 122.

Whatever the case, upon receipt of the job information, the target entities (118, 120, 122, . . . ) can perform prescribed processing on the job information, such as by printing it, displaying it, archiving it, etc.

C. Exemplary Computer Environment

Figure 6:
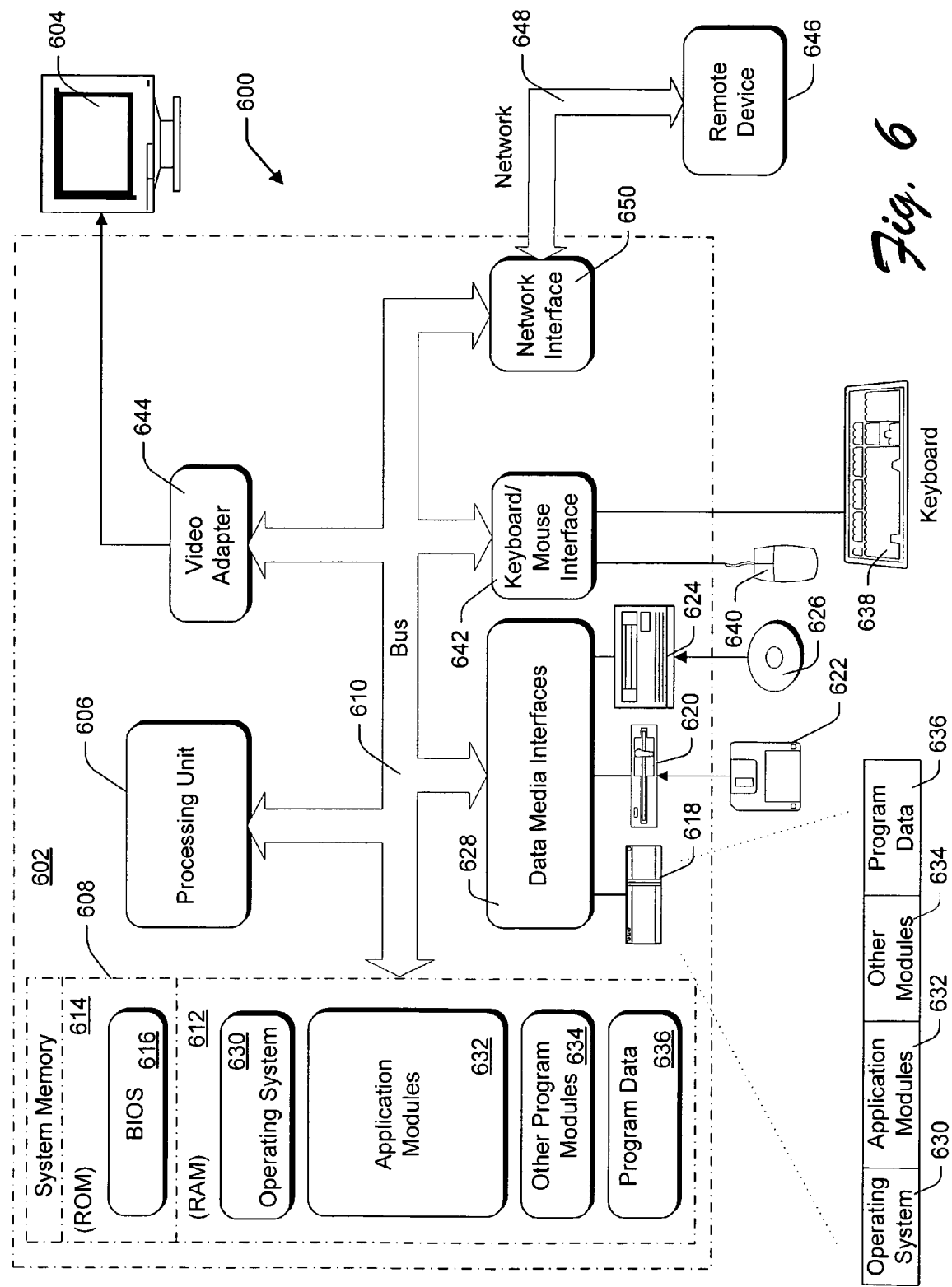
FIG. 6 shows an exemplary computer environment that can be used to implement the functionality discussed herein.

In one exemplary implementation, the application module 110, APIs 114, and spooling module 116 can be implemented by software executed by a computing device. In this case, FIG. 6 provides information regarding an exemplary computer environment 600 that can be used to implement this functionality. For a target entity that is implemented by a computing mechanism as well, such a computing mechanism can also be implemented using the type of computing environment 600 shown in FIG. 6, or using a related environment.

The computing environment 600 includes a general purpose type computer 602 and a display device 604. However, the computing environment 600 can include other kinds of computing equipment. For example, although not shown, the computer environment 600 can include hand-held or laptop devices, set top boxes, mainframe computers, etc. Further, FIG. 6 shows elements of the computer environment 600 grouped together to facilitate discussion. However, the computing environment 600 can employ a distributed processing configuration. In a distributed computing environment, computing resources can be physically dispersed throughout the environment.

Exemplary computer 602 includes one or more processors or processing units 606, a system memory 608, and a bus 610. The bus 610 connects various system components together. For instance, the bus 610 connects the processor 606 to the system memory 608. The bus 610 can be implemented using any kind of bus structure or combination of bus structures, including a memory bus or memory controller, a peripheral bus, an accelerated graphics port, and a processor or local bus using any of a variety of bus architectures.

Computer 602 can also include a variety of computer readable media, including a variety of types of volatile and non-volatile media, each of which can be removable or non-removable. For example, system memory 608 includes computer readable media in the form of volatile memory, such as random access memory (RAM) 612, and non-volatile memory, such as read only memory (ROM) 614. ROM 614 includes an input/output system (BIOS) 616 that contains the basic routines that help to transfer 19 information between elements within computer 602, such as during start-up. RAM 612 typically contains data and/or program modules in a form that can be quickly accessed by processing unit 606.

Other kinds of computer storage media include a hard disk drive 618 for reading from and writing to a non-removable, non-volatile magnetic media, a magnetic disk drive 620 for reading from and writing to a removable, non-volatile magnetic disk 622 (e.g., a "floppy disk"), and an optical disk drive 624 for reading from and/or writing to a removable, non-volatile optical disk 626 such as a CD-ROM, DVD-ROM, or other optical media. The hard disk drive 618, magnetic disk drive 620, and optical disk drive 624 are each connected to the system bus 610 by one or more data media interfaces 628. Alternatively, the hard disk drive 618, magnetic disk drive 620, and optical disk drive 624 can be connected to the system bus 610 by a SCSI interface (not shown), or other coupling mechanism. Although not shown, the computer 602 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 602. For instance, the readable media can store the operating system 630, application modules 632 (e.g., for implementing the application module 110), other program modules 634, and program data 636. The computer readable media 1 can also store, although not shown, logic for implementing the APIs 114 and spooling module 116. Any of the above-described storage media can be used to implement the spool storage 112, such as hard disk 618.

The computer environment 600 can include a variety of input devices. For instance, the computer environment 600 includes the keyboard 638 and a pointing device 640 (e.g., a "mouse") for entering commands and information into computer 602. The computer environment 600 can include other input devices (not illustrated), such as a microphone, joystick, game pad, satellite dish, serial port, scanner, card reading devices, digital or video camera, etc. Input/output interfaces 642 couple the input devices to the processing unit 606. More generally, input devices can be coupled to the computer 602 through any kind of interface and bus structures, such as a parallel port, serial port, game port, universal serial bus (USB) port, etc.

The computer environment 600 also includes the display device 604. A video adapter 644 couples the display device 604 to the bus 610. In addition to the display device 604, the computer environment 600 can include other output peripheral devices, such as speakers (not shown), a printer (not shown), etc. Any of these units can constitute the target entities (118, 120, 122, . . . ) shown in FIG. 1.

Computer 602 operates in a networked environment using logical connections to one or more remote computers, such as a remote computing device 646. The remote computing device 646 can comprise any kind of computer equipment, including a general purpose personal computer, portable computer, a server, remote printer or archival device, etc. Any of these units can also constitute the target entities (118, 120, 122, . . . ) shown in FIG. 1. Remote computing device 646 can include all of the features discussed above with respect to computer 602, or some subset thereof.

Any type of network 648 can be used to couple the computer 602 with remote computing device 646, such as a WAN, a LAN, etc. The computer 602 couples to the network 648 via network interface 650, which can utilize broadband connectivity, modem connectivity, DSL connectivity, or other connection strategy. Although not illustrated, the computing environment 600 can provide wireless communication functionality for connecting computer 602 with remote computing device 646 (e.g., via modulated radio signals, modulated infrared signals, etc.).

In closing, a number of examples were presented in this disclosure in the alternative (e.g., case A or case B). In addition, this disclosure encompasses those cases which combine alternatives in a single implementation (e.g., case A and case B), even though this disclosure may not have expressly mention these conjunctive cases in every instance.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer readable memory device, comprising:
a spool storage for storing a fixed page of a job, the fixed page having a fixed layout and static content that are fixed prior to the fixed page being stored by the spool storage;
a spool storage data structure stored on the computer readable memory device, the spool storage data structure including:
a first part containing data representing the fixed page of the job;
a second part containing data representing a fixed document of the job, the second part being generated to include a reference to the first part;
a third part containing data representing a fixed sequence of documents of the job, the third part being generated to include a reference to the second part; and
a fourth part containing data representing a root of the job, the fourth part being generated to include a reference to the third part,
wherein the data includes descriptive properties of at least one of the first, second, third, and fourth parts, persisted in schematized metadata attached to the at least one of the first, second, third, and fourth parts; and
filter logic configured to process the data of at least one of the first, second, third, and fourth parts, the filter logic comprising a filter configuration module and a plurality of filters, the filter configuration module being configured to define which of the plurality of filters are to be invoked to process the data of the at least one of the first, second, third, and fourth parts, and the filter configuration module further configured to chain two or more of the plurality of filters together in different arrangements, summing processes of the two or more filters to produce different net effects on a presentation of the data based on the different arrangements, the processing of the data being controlled by one or more print tickets which include the schematized metadata.

2. A computer readable memory device as recited in claim 1, the data structure further including:
a fifth part containing data representing a shared resource of the job, the shared resource being associated with the fourth part and being referenced by one or more of the first part, the second part, and the third part.

3. A computer readable memory device as recited in claim 2, the data structure further including:
a plurality of additional parts that each include data representing a print ticket of the job, wherein a different one of the plurality of additional parts is associated with each of the first part, the second part, the third part, the fourth part, and the fifth part.

4. A computer readable memory device as recited in claim 1, the data structure further including:
a plurality of additional parts that each include data representing an additional fixed sequence of documents of the job, the fourth part including a reference to each of the plurality of additional parts.

5. A computer readable memory device as recited in claim 1, the data structure further including:
a plurality of additional parts that each include data representing an additional fixed document of the job, the third part including a reference to each of the plurality of additional parts.

6. A computer readable memory device as recited in claim 1, the data structure further including:
a plurality of additional parts that each include data representing an additional fixed page of the job, the second part including a reference to each of the plurality of additional parts.

7. A computer readable memory device as recited in claim 1, the data structure further including:
a plurality of additional parts that each include data representing descriptive metadata, wherein a different one of the plurality of additional parts is associated with each of the first part, the second part, the third part, and the fourth part.

8. A computer readable memory device, comprising:
a data structure stored on the computer readable memory device, the data structure specifying job information to be processed by a spooling module, the data structure including a plurality of nodes organized into a hierarchical arrangement representing different aspects of the job information, wherein at least one of the plurality of nodes comprises a resource node containing data representing a shared resource of the job information, the at least one node being associated with only a root node of the plurality of nodes but referenced by other nodes of the plurality of nodes; and
filter logic configured to process the job information, the filter logic comprising a filter configuration module and a plurality of filters, the filter configuration module being configured to chain two or more of the plurality of filters together to produce different net effects on a presentation of the job information, the filter logic configured to convert the job information into a plurality of formats accepted by a plurality of different printers,
wherein processing the job information is controlled by one or more print tickets which include schematized metadata, the metadata comprising descriptive properties of the plurality of nodes, the descriptive properties being organized based on the hierarchical arrangement; and
wherein the plurality of nodes comprises at least one fixed page node representing a fixed page having a fixed layout and static content that are fixed prior to the fixed page being processed by the spooling module.

9. A computer readable memory device of claim 8, wherein the plurality of nodes comprises at least one job node representing an entire job to be processed by the spooling module.

10. A computer readable memory device of claim 8, wherein the plurality of nodes comprises at least one fixed document sequence node representing a fixed document sequence to be processed by the spooling module.

11. A computer readable memory device of claim 8, wherein the plurality of nodes comprises at least one fixed document node representing a document to be processed by the spooling module.

12. A computer readable memory device of claim 8, wherein the plurality of nodes comprises:
at least one job node representing an entire job to be processed by the spooling module;
at least one fixed document sequence node representing a document sequence to be processed by the spooling module; and at least one fixed page node representing a page to be processed by the spooling module.

13. A computer readable memory device of claim 8, wherein the resource node represents an image resource to be processed by the spooling module.

14. A computer readable memory device of claim 8, wherein the resource node represents a font resource to be processed by the spooling module.

15. A system for consuming job information of a job using a spooling entity, the system comprising:
- a processor; and
- one or more memories communicatively coupled to the processor, the one or more memories having stored instructions that, when executed at the system, configure the system to implement the spooling entity, wherein the spooling entity is configured to store and arrange the job information, the job information including a fixed page of the job, the fixed page having a fixed layout and static content that are fixed prior to the fixed page being stored in the spooling entity, the job information being arranged to include a plurality of nodes organized into a hierarchical arrangement representing the job information, the plurality of nodes including:
    - a first node representing the fixed page of the job;
    - a second node representing a fixed document of the job, the second node including a reference to the first node;
    - a third node containing data representing a fixed sequence of documents of the job, the third node including a reference to the second node; and
    - a fourth node containing data representing a root of the job, the fourth node including a reference to the third node,
- wherein descriptive properties, persisted in schematized metadata, of each of the first, second, third, and fourth nodes are attached to each of the first, second, third, and fourth nodes respectively, and
- wherein the spooling entity further comprises filter logic configured to process the job information of at least one of the first, second, third, and fourth nodes, the filter logic comprising a filter configuration module and a plurality of filters, the filter configuration module being configured to define which of the plurality of filters are to be invoked to process the job information of the at least one of the first, second, third, and fourth nodes,
- the processing of the job information being controlled by instructions on a plurality of print tickets which include the schematized metadata, wherein the plurality of print tickets are applied to different ones of the first, second, third, and fourth nodes and wherein the instructions are aggregated at the first, second, third, and fourth nodes based on the respectively applied print tickets and the hierarchical arrangement.

16. A system as recited in claim 15, the plurality of nodes further including:
    a fifth node representing a shared resource of the job, the shared resource being associated with the fourth node and being referenced by one or more of the first node, the second node, and the third node.

17. A system as recited in claim 15, the plurality of nodes further including:
    a plurality of additional nodes each representing an additional sequence of documents of the job, the fourth node including a reference to each of the plurality of additional parts.

18. A system as recited in claim 15, the plurality of nodes further including:
    a plurality of additional nodes each representing an additional fixed document of the job, the third node including a reference to each of the plurality of additional nodes.

19. A system as recited in claim 15, the plurality of nodes further including:
    a plurality of additional nodes that each include data representing descriptive metadata, wherein a different one of the plurality of additional nodes is associated with each of the first node, the second node, the third node, and the fourth node.

* * * * *